US006967973B2

(12) United States Patent
Yamagishi

(10) Patent No.: US 6,967,973 B2
(45) Date of Patent: Nov. 22, 2005

(54) DATA TRANSFER APPARATUS AND ITS CONTROL METHOD

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 10/685,421

(22) Filed: Oct. 16, 2003

(65) Prior Publication Data

US 2005/0013322 A1 Jan. 20, 2005

Related U.S. Application Data

(62) Division of application No. 09/298,829, filed on Apr. 26, 1999, now Pat. No. 6,731,650.

(30) Foreign Application Priority Data

Apr. 27, 1998 (JP) ................................ 10-117313
Jul. 31, 1998 (JP) ................................ 10-218174

(51) Int. Cl.[7] ................................................ H04J 3/16
(52) U.S. Cl. ...................................... 370/468; 370/391
(58) Field of Search ............................... 370/341–346, 370/329, 209, 335, 395, 468, 391, 486, 465, 370/461; 455/450, 440, 452, 452.2, 442, 455/422.1; 710/113, 116, 107; 358/1.15; 345/632; 348/14.1, 14.01, 14.08, 130; 382/239

(56) References Cited

U.S. PATENT DOCUMENTS 5,299,192 A 3/1994 Guo et al. .................. 370/210
5,471,671 A 11/1995 Wang et al. ................ 455/226
5,534,914 A * 7/1996 Flohr et al. ................ 348/14.1
5,535,208 A * 7/1996 Kawakami et al. ......... 370/391
5,699,356 A 12/1997 Beever et al. .............. 370/329
5,969,753 A * 10/1999 Robinson .................... 348/130
5,978,876 A 11/1999 Greaves ...................... 710/107
5,983,301 A 11/1999 Baker et al. ................ 710/113
5,991,842 A 11/1999 Takayama ................... 710/105
6,031,845 A 2/2000 Walding ..................... 370/468
6,072,808 A * 6/2000 O'Connor ................... 370/486
6,088,578 A 7/2000 Manning et al. .............. 455/68
6,128,659 A 10/2000 Subblah et al. ............. 709/225
6,208,629 B1 * 3/2001 Jaszewski et al. .......... 370/329
6,230,219 B1 5/2001 Fields, Jr. et al. ............ 710/22
6,233,637 B1 5/2001 Smyers et al. .............. 710/129

(Continued)

FOREIGN PATENT DOCUMENTS

JP 7-264219 A 10/1995

(Continued)

OTHER PUBLICATIONS

Teener, M.; A bus on a diet-the serial bus alternative-an introduction to the P1394 High Performance Bus, Feb. 24-28, 1992, IEEE CNF, Compcon Spring '92. Thirty-Seventh IEEE Computer Society International Conference Papers., pp. 316-321.*

(Continued)

*Primary Examiner*—Chi Pham
*Assistant Examiner*—Prenell Jones
(74) *Attorney, Agent, or Firm*—Fitzpatrick, Cella, Harper & Scinto

(57) ABSTRACT

In data transfer in isochronous mode using an IEEE1394 serial bus, the data transfer rate is guaranteed, but data transfer is disabled if the number of channels is insufficient. An already assigned channel is released by lowering the data transfer rate currently using that channel, and the released channel is assigned to new data transfer, thus allowing the new data transfer.

3 Claims, 27 Drawing Sheets

U.S. PATENT DOCUMENTS

| | | | | |
|---|---|---|---|---|
| 6,246,881 | B1 | 6/2001 | Parantainen et al. | 455/450 |
| 6,273,535 | B1 | 8/2001 | Inoue et al. | 347/2 |
| 6,298,405 | B1 | 10/2001 | Ito et al. | 710/107 |
| 6,307,974 | B1 * | 10/2001 | Tsujimoto | 382/239 |
| 6,356,555 | B1 * | 3/2002 | Rakib et al. | 370/441 |
| 6,366,964 | B1 | 4/2002 | Shima et al. | 710/8 |
| 6,408,019 | B1 | 6/2002 | Pickering et al. | 375/200 |
| 6,466,554 | B2 | 10/2002 | Okada | 370/312 |
| 6,570,865 | B2 * | 5/2003 | Masui et al. | 370/342 |
| 6,631,432 | B1 | 10/2003 | Yamagishi | 710/107 |
| 6,819,444 | B1 * | 11/2004 | Yamagishi | 358/1.15 |

FOREIGN PATENT DOCUMENTS

| | | | |
|---|---|---|---|
| JP | 8-008913 | A | 1/1996 |
| JP | 9-238142 | A | 2/1996 |
| JP | 9-116556 | A | 5/1997 |
| JP | 10-303943 | A | 11/1998 |
| JP | 2000-115198 | A | 4/2000 |

OTHER PUBLICATIONS

Hoffman, G. et al; IEEE 1394: a ubiquitous bus, IEEE CNF, Compcon '95. Technologies for the Information Superhighway, Digest of Papers, Mar. 5-9, 1995, pp. 334-338.*

* cited by examiner

FIG. 16

| DEVICE | NUMBER OF ACQUIRED CHANNELS |
|---|---|
| SCANNER B | 3 |
| HOST C | 4 |
| PRINTER A | 0 |
| PRINTER B | 1 |
| . | . |
| . | . |

DATA TRANSFER APPARATUS AND ITS CONTROL METHOD

CROSS REFERENCE TO RELATED APPLICATION

This application is a division of application Ser. No. 09/298,829, filed Apr. 26, 1999 now U.S. Pat. No. 6,731, 650.

BACKGROUND OF THE INVENTION

The present invention relates to a data transfer apparatus for transmitting/receiving, e.g., image data via communications, and its control method and, more particularly, to a data transfer apparatus of, e.g., an image processing device which outputs a large volume of data onto a communication path and must guarantee a given lower reduce of the data transfer rate like in a case wherein image data is transmitted to and printed by an electrophotographic printer, and its control method.

In recent years, high-speed serial communications such as IEEE1394 and the like begin to be used.

USB, IEEE1394, and the like comprise a mechanism for implementing data transfer with a data transfer rate guaranteed such as isochronous transfer mode. In isochronous transfer mode, since a required number of channels capable of data transfer are assured at prescribed cycle time intervals, a data transfer rate corresponding to the processing performance of a device is assured to transfer image data from an image scanning device to a computer or from the computer to an image forming device.

In high-speed serial communications such as IEEE1394, since the number of channels capable of data transfer in each prescribed cycle time interval is limited, if a given device has assured channels in such conventional image processing system, another device often fails to assure a required number of channels.

SUMMARY OF THE INVENTION

The present invention has been made in consideration of the aforementioned prior art, and has as its object to provide an image processing system including a data transfer apparatus, which, if there is a device which cannot assure a required number of channels, adjusts the total number of channels required including those already assured by some other device, and can prevent data transfer from failing due to an insufficient number of channels.

In order to achieve the above object, according to the present invention, when the total of the number of channels that have already been assigned to a given device and the number of newly requested channels has exceeded the number of channels the system has upon generation of a new channel acquisition request from another device in the system, the total number of channels required in the system including those already assigned to the given device is adjusted to be equal to or smaller than the number of channels the system has.

To attain the adjustment, the device to which channels have already been assigned is made to release releasable channels, and those released channels are assigned to the device that issued the new channel request.

Alternatively, to attain the adjustment, the number of channels required by the device that issued the new channel request is decreased.

Alternatively, to attain the adjustment, when the number of assigned channels cannot reach the number of requested channels even after the device to which channels have already been assigned is made to release releasable channels, and those released channels are assigned to the device that issued the new channel request, the number of channels required by the device that issued the new channel request is decreased.

Conversely, to attain the adjustment, when the number of assigned channels cannot reach the number of requested channels even after the device that issued the new channel request decreases the number of requested channels, the device to which channels have already been assigned is made to release releasable channels, and those released channels are assigned to the device that issued the new channel request.

In order to achieve the above object, one aspect of the present invention comprises the following arrangement.

That is, a data transfer apparatus which is connected to other devices via a communication path having a predetermined number of transfer channels, comprises:

adjustment means for adjusting channel assignment to limit a sum of the number of channels required for new data transfer and the number of already assigned channels to a value not more than the predetermined number, when the sum total exceeds the predetermined number upon executing data transfer between the devices; and assignment means for assigning channels, the number of which is adjusted by the adjustment means, to the device that transfers data.

More preferably, the adjustment means decreases the number of channels to limit the sum to a value not more than the predetermined number by reducing a data transfer rate of the device to which channels have already been assigned, when the sum of the number of channels required for new data transfer and the number of already assigned channels exceeds the predetermined number.

More preferably, the adjustment means decreases the number of channels to limit the sum to a value not more than the predetermined number by reducing a data transfer rate of new data transfer, when the sum of the number of channels required for new data transfer and the number of already assigned channels exceeds the predetermined number.

More preferably, the adjustment means assigns empty channels to a device which requests new data transfer, and adjusts channel assignment when the number of assigned channels does not reach the number of channels required for data transfer.

More preferably, the adjustment means adjusts the number of channels assigned to the devices connected via the communication path.

More preferably, the plurality of devices include a computer and image scanning device.

More preferably, the plurality of devices include a computer and image forming device.

More preferably, the communication path is a one for transferring data in isochronous mode specified in IEEE1394.

The present invention has as its another object to provide data transfer apparatus having a new feature and control method for the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16 shows an example of a channel assignment table in the first embodiment;

DESCRIPTION OF THE PREFERRED EMBODIMENTS

[First Embodiment]

The first embodiment of the present invention will be described below with reference to the accompanying drawings.

Figure 1:
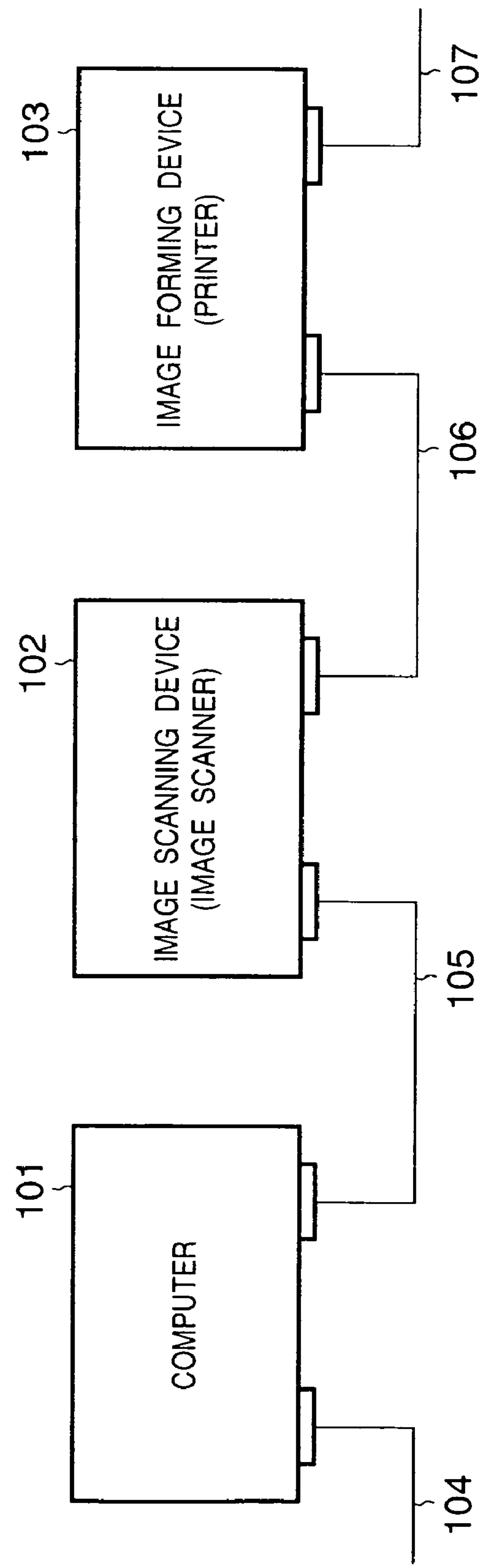
FIG. 1 is a diagram showing the overall system arrangement according to an embodiment of the present invention.

FIG. 1 is a diagram showing the arrangement of an image processing system according to an embodiment of the present invention. Referring to FIG. 1, a computer 101 is the one used by an ordinary user, and is connected to an image scanning device 102 such as an image scanner or the like, which converts an image signal scanned by, e.g., a CCD into digital data, and outputs the digital data, via a high-speed serial communication I/F 105. Furthermore, the image scanning device 102 is connected to an image forming device 103, such as an electrophotographic printer or the like, via a high-speed serial communication I/F 104. The image forming device 103 is connected to another device (not shown) via a high-speed serial communication I/F 107 as needed.

With this arrangement, the computer 101 is also connected to the image forming device 103. The image forming device 103 has a print function of an image and the like created by the computer. When a document or image created by the computer 101 is to be printed, the image forming device 103 receives image forming data from the computer 101 via the high-speed serial communication I/Fs 105 and 106, and prints that data after it executes required image processes.

The high-speed serial communication I/Fs 104, 105, 106, and 107 comprise a mechanism for assuring a pre-set data transfer rate like isochronous transfer mode of USB, IEEE1394, and the like, and normally adopt a serial bus arrangement. In this embodiment, an IEEE1394 serial bus is used as the high-speed serial communication I/F.

<Arrangement of Computer>

Figure 2:
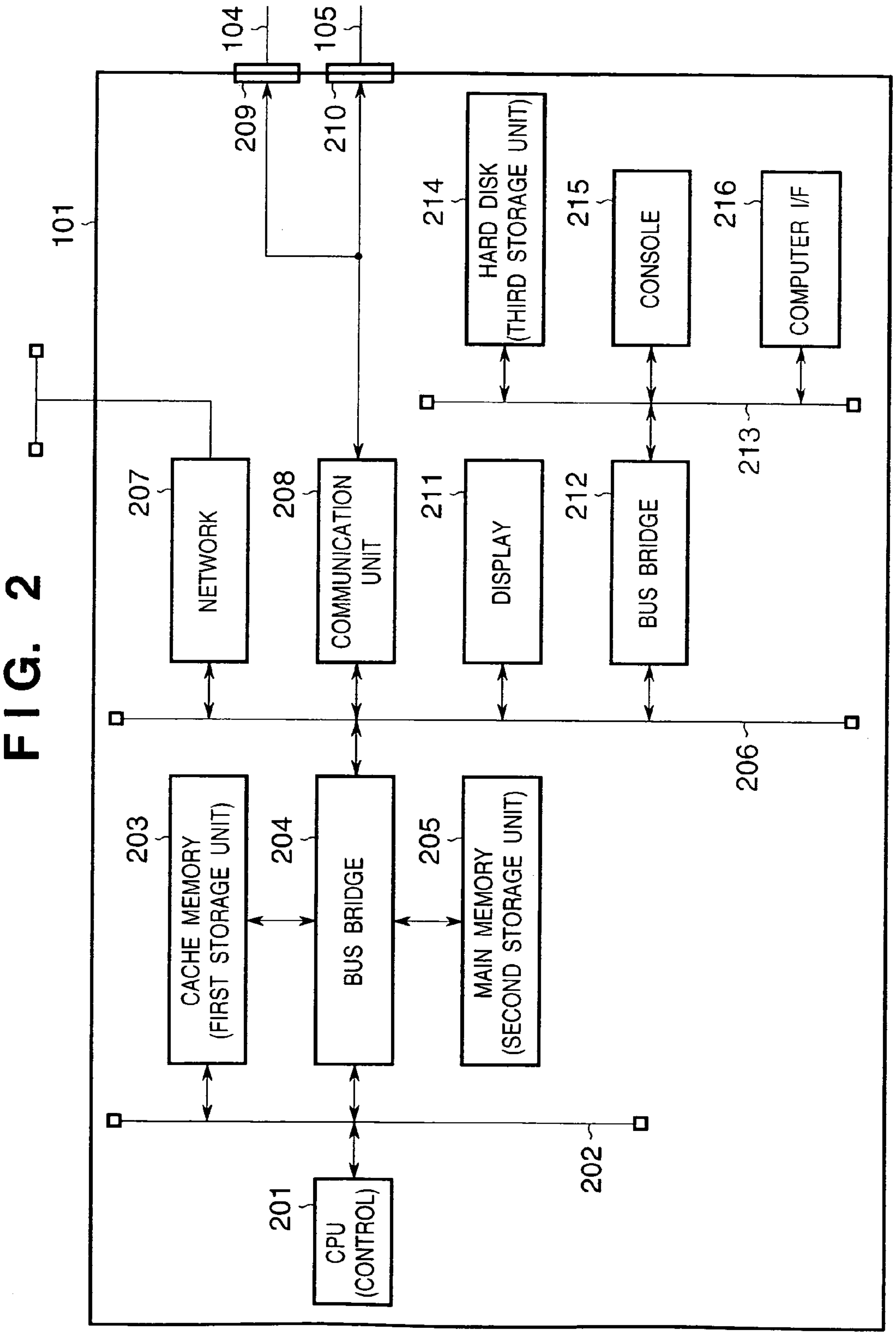
FIG. 2 is a block diagram showing the arrangement of a computer according to the embodiment of the present invention.

The computer 101 mentioned above will be explained below with reference to FIG. 2.

A CPU (control unit) 201 is a control means for controlling the overall computer. A CPU bus 202 connects the CPU 201, a cache memory 203, and a bus bridge 204 to each other, and transfers data to be processed by the CPU 201 at high speed.

The cache memory (first storage unit) 203 can be accessed by the CPU 201 at high speed, and temporarily stores data used in computation of the CPU 201. Normally, the cache memory 203 uses a high-speed SRAM or the like.

The bus bridge 204 connects the CPU bus 202 and a high-speed bus 206 (to be described later), and absorbs any processing speed difference between these buses. With the intervention of the bus bridge 204, the high-speed CPU 201 can exchange data with the respective units connected to the high-speed bus 206. The bus bridge 204 also has a memory controller function, and executes a series of memory management operations for reading out data, which is temporarily written by the CPU 201 in the cache memory 203 at high speed, at a predetermined timing and writing the readout data in a main memory 205, and also writing data, which is read out from the main memory 205 in accordance with a request from the CPU 201, in the cache memory 203.

The main memory 205 (second storage unit) 205 stores data and programs upon executing various applications and the like by the CPU 201. Normally, the main memory 205 uses a DRAM or the like.

The high-speed bus 206 connects the bus bridge 204 to a network I/F 207, high-speed serial communication unit 208, a display 211, and a bus bridge 212. The high-speed bus 206 transfers data processed by the CPU 201 to the respective units, and also transfers (DMA-transfers) data among the respective units. Normally, the high-speed bus 206 uses a PCI bus or the like.

The network I/F 207 connects the computer 101 to a network, and exchanges data with the network. The network connected is normally Ethernet, token ring, or the like.

The high-speed serial communication unit 208 comprises a mechanism that transfers data at a pre-set data transfer rate such as IEEE1394 isochronous transfer mode, and can exchange image data of a large size at high speed within a predetermined period of time. Isochronous transfer mode assures channels whose data transfer cycles are guaranteed, and broadcasts data packets onto the network using the assured channels. The data transfer rate can be increased every time a required number of channels are assured.

The high-speed serial communication unit 208 also has a mechanism for making one-to-one asynchronous transfer like IEEE1394 asynchronous transfer mode, and can make predetermined communications with the image scanning device 102 and image forming device 103 as needed. Data transfer is done using packets.

The high-speed serial communication unit 208 normally uses an IEEE1394 serial bus or the like. Assume that this embodiment uses an IEEE1394 serial bus. High-speed serial communication connectors 209 and 210 connect the high-speed serial communication interface 105 and the computer 101.

The display 211 is comprised of a liquid crystal display device, loudspeaker, and the like, and outputs characters, images, voices, and the like required upon execution of a program by the CPU 201.

The bus bridge 212 connects the high-speed bus 206 and a low-speed bus 213 (to be described later), and absorbs any processing speed difference between these buses. With the intervention of this bus bridge 212, the respective units that operate at high speed can exchange data with units which are connected to the low-speed bus 213 and operate at low speed.

The low-speed bus 213 connects the bus bridge 213 to a hard disk 214, console 215, and computer interface 216. The low-speed bus 213 has lower transfer rate than the high-speed bus 206, and connects units with relatively low processing performance. Normally, the low-speed bus 213 uses an ISA bus or the like.

The hard disk (third storage unit) 214 stores a plurality of application programs, data, and the like used upon operation of the CPU 201. Normally, the hard disk 214 comprises a large-capacity hard disk, and is managed by the CPU 201.

The console 215 is comprised of a keyboard, microphone, and the like, and is used for inputting various setups required for operating the computer 101 and/or inputting various operation instructions to the CPU 201.

The low-speed computer interface 216 connects the computer 101 to peripheral devices. Normally, the interface 216 uses an RS-232C that makes serial communications, a Centronics interface that makes parallel communications, and the like.

<Arrangement of Image Scanning device>

Figure 3:
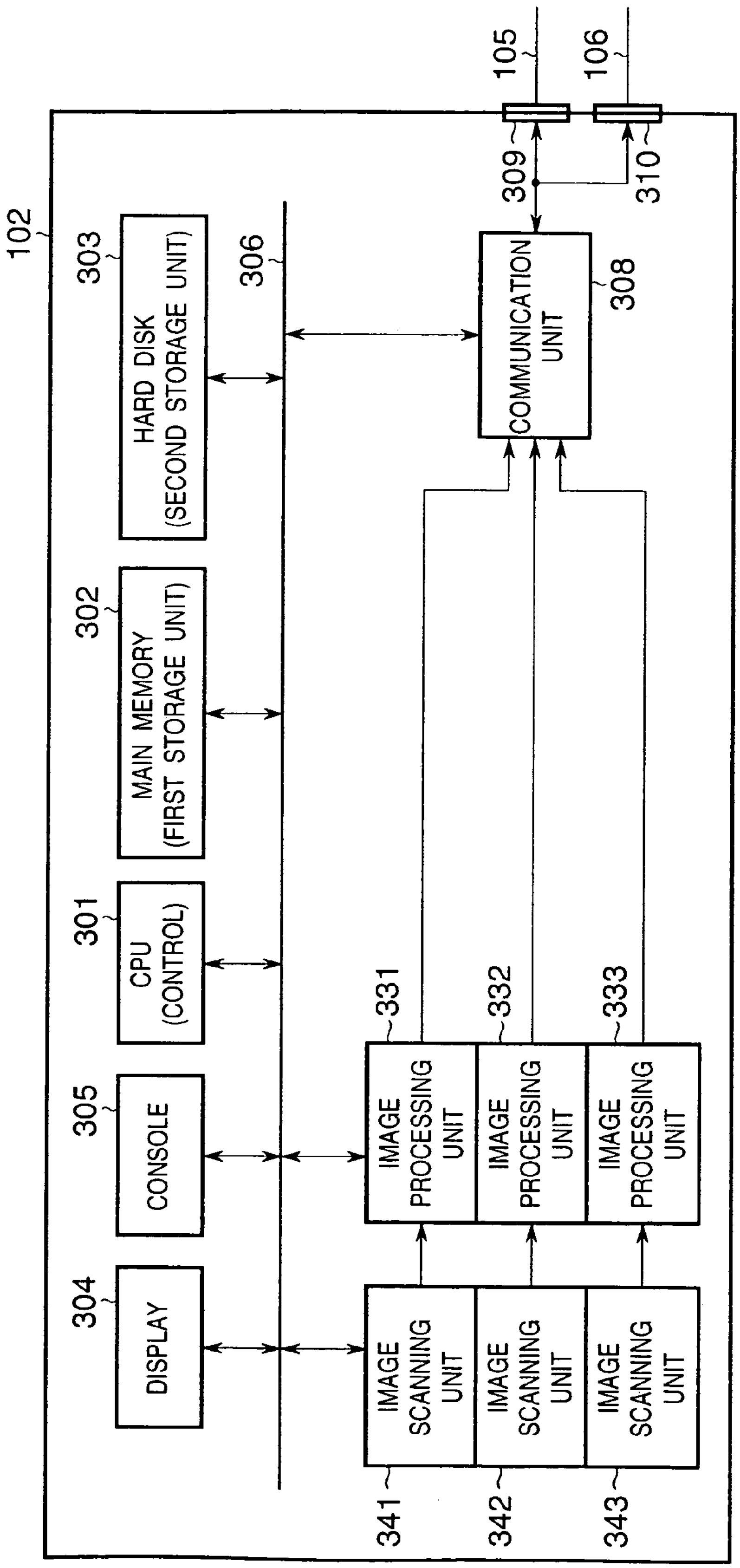
FIG. 3 is a block diagram showing the arrangement of an image scanning device according to the embodiment of the present invention.

The above-mentioned image scanning device 102 will be described using FIG. 3.

A CPU 301 controls the overall image scanning device, and operates under the control of a real-time OS.

A main memory 302 is used as a work memory when the CPU 301 operates, and can be accessed by the CPU 301 at high speed.

A hard disk 303 stores a plurality of application programs, scanned image data, and the like upon operation of the CPU 301. Normally, the hard disk 303 comprises a large-capacity hard disk, and is managed by the CPU 301.

A display 304 comprises, e.g., a liquid crystal display unit, and a console 305 has a touch panel input device adhered to the surface of the liquid crystal display 304 and a plurality of hardware keys. A signal input by the touch panel or one of hardware keys of the console 305 is supplied to the CPU 301 via a CPU bus 306. The liquid crystal display 304 displays image data read out from the main memory 302 or hard disk 303 by the CPU 301 and sent therefrom. The liquid crystal display 304 displays functions upon operation of the image scanning device of this embodiment, image data, and the like.

The console 305 may also comprise input means such as a digitizer and pen recognition (handwritten character recognition) means that allows pen input, a microphone and voice recognition means for voice input, an image sensing means and image recognition means for image input, and the like.

The CPU bus 306 connects the CPU 301, main memory 302, and hard disk 303 to various function units. The CPU bus 306 transfers data processed by the CPU 301 to the respective function units, and transfers (DMA-transfers) data at high speed among the function units.

A high-speed serial communication unit 308 comprises a mechanism that transfers data at a pre-set data transfer rate such as IEEE1394 isochronous transfer mode, and can exchange image data of a large size at high speed within a predetermined period of time. Isochronous transfer mode assures channels whose data transfer cycles are guaranteed, and broadcasts data packets onto the network using the assured channels. The data transfer rate can be increased every time a required number of channels are assured.

The high-speed serial communication unit 308 also has a mechanism for making one-to-one asynchronous transfer like asynchronous transfer mode, and can make predetermined communications with the computer 101 and image forming device 103 as needed. Data transfer is done using packets.

The high-speed serial communication unit 308 normally uses an IEEE1394 serial bus or the like. Assume that this embodiment uses an IEEE1394 serial bus. High-speed serial communication connectors 309 and 310 connect the image scanning device 102 to the computer 101 via the high-speed serial communication interface 105 and the image scanning device 102 to the image forming device 103 via the high-speed serial communication interface 106.

Image processing units 331, 332, and 333 execute various image processes such as shading correction, smoothing, edge process, color correction, and the like for the respective color image data received from image scanning units 341, 342, and 343 in accordance with a processing command supplied from the CPU 301, and output the processed data via the high-speed serial communication unit 308. The image scanning units 341, 342, and 343 comprise image sensing elements such as CCDs, and the like. The image scanning units 341, 342, and 343 convert scanned image signals into image data in units of colors, and respectively output the image data to the image processing units 331, 332, and 333.

The mechanism of the image scanning device will be explained below with reference to FIG. 17.

A document feeder 11 feeds originals one by one in turn from the last page onto a platen glass 12, and exhausts the original on the platen glass 12 after completion of original scanning.

When an original is fed onto the platen glass 12, a lamp in a scanner unit 13 is turned on, and the scanner unit 13 begins to move, thus exposing and scanning the original.

Light reflected by the original at that time is guided to an image sensing element 16 via a plurality of mirrors 14 and a lens 15. In this way, the image of the scanned original is read by the image sensing element 16.

The image data output from the image sensing element 16 undergoes predetermined processes, and the processed data is transferred to a scanner I/F (not shown; comprising a video I/F or high-speed serial communication I/F).

<Arrangement of Image Forming Device>

Figure 4:
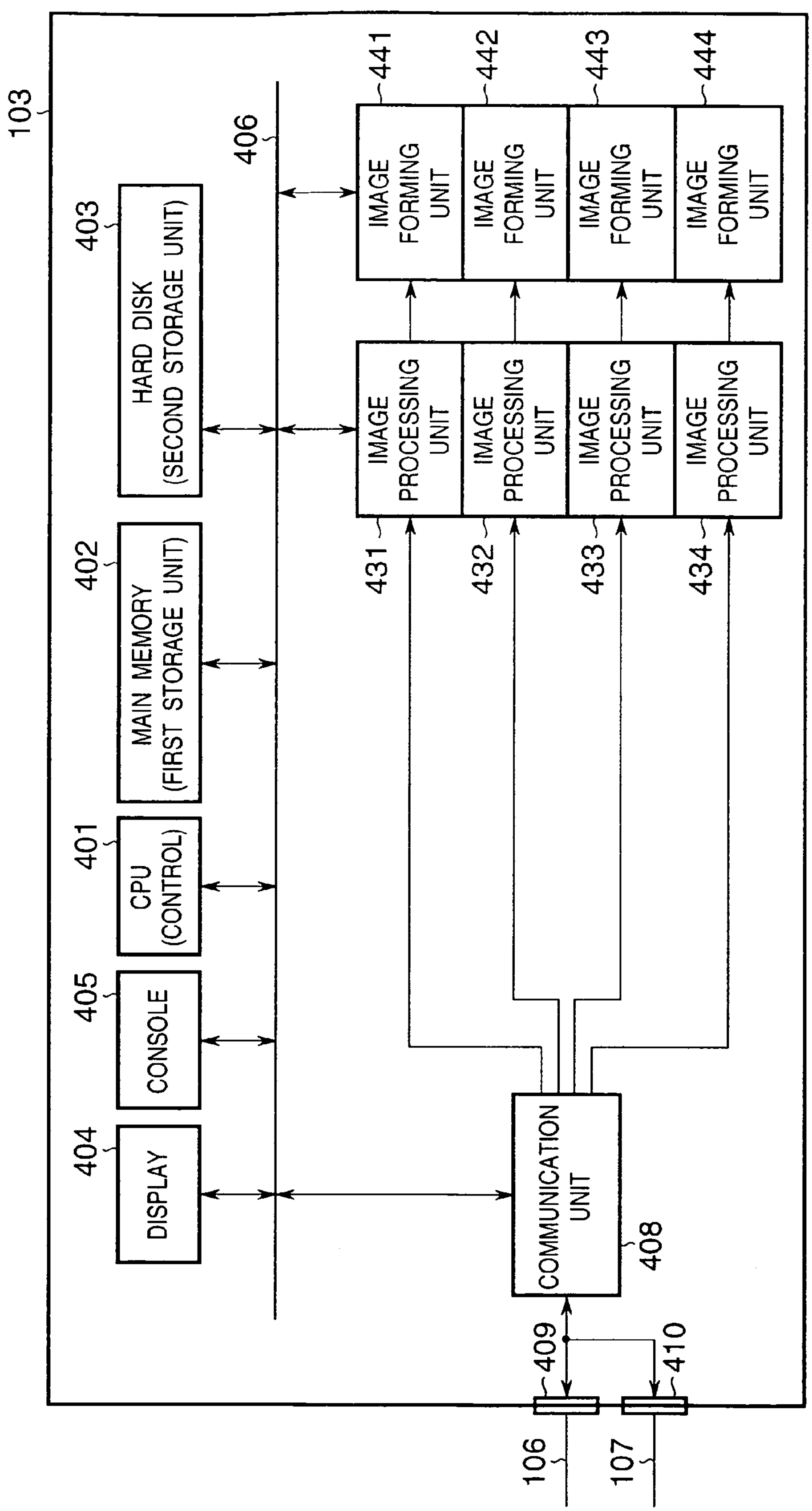
FIG. 4 is a block diagram showing the arrangement of an image forming device according to the embodiment of the present invention.

The aforementioned image forming device 103 will be described below with the aid of FIG. 4.

A CPU 401 controls the overall image scanning device, and operates under the control of a real-time OS.

A main memory (second storage unit) 402 is used as a work memory when the CPU 401 operates, and can be accessed by the CPU 401 at high speed.

A hard disk (third storage unit) 403 stores a plurality of application programs, scanned image data, and the like upon operation of the CPU 401. Normally, the hard disk 403 comprises a large-capacity hard disk, and is managed by the CPU 401.

A display 404 comprises, e.g., a liquid crystal display unit, and a console 405 has a touch panel input device adhered to the surface of the liquid crystal display 404 and a plurality of hardware keys. A signal input by the touch panel or one of hardware keys of the console 405 is supplied to the CPU 401 via a CPU bus 406. The liquid crystal display 404 displays image data read out from the main memory 402 or hard disk 403 by the CPU 401 and sent therefrom. The liquid crystal display 404 displays functions upon operation of the image forming device of this embodiment, image data, and the like.

The console 405 may also comprise input means such as a digitizer and pen recognition (handwritten character recognition) means that allows pen input, a microphone and voice recognition means for voice input, an image sensing means and image recognition means for image input, and the like.

The CPU bus 406 connects the CPU 401, main memory 402, and hard disk 403 to various function units. The CPU bus 406 transfers data processed by the CPU 401 to the respective function units, and transfers (DMA-transfers) data at high speed among the function units.

A high-speed serial communication unit 408 comprises a mechanism that transfers data at a pre-set data transfer rate such as isochronous transfer mode, and can exchange image data of a large size at high speed within a predetermined period of time. Isochronous transfer mode assures channels whose data transfer cycles are guaranteed, and broadcasts data packets onto the network using the assured channels. The data transfer rate can be increased every time a required number of channels are assured.

The high-speed serial communication unit 408 also has a mechanism for making one-to-one asynchronous transfer like asynchronous transfer mode, and can make predetermined communications with the computer 101 and image forming device 103 as needed. Data transfer is done using packets. The high-speed serial communication unit 408 normally uses an IEEE1394 serial bus or the like. Assume that this embodiment uses an IEEE1394 serial bus.

High-speed serial communication connectors 409 and 410 connect the image forming device 103 to the image scanning device 102 via the high-speed serial communication interface 106.

Image processing units 431, 432, 433, and 434 execute various image processes such as smoothing, an edge process, color correction, and the like of the respective color image data input via the high-speed serial communication unit 408 in accordance with a processing command supplied from the CPU 401.

Image forming units 441, 442, 443, and 444 form images corresponding to received image data on a recording paper sheet as visual image data in units of colors. As an image formation method, electrophotography that forms an image by forming a latent image on a photosensitive drum using a laser beam, LED light, or the like, may be used.

The mechanism of the image forming device will be explained below using FIG. 18.

In the image forming unit 103, light-emitting units 21, 22, 23, and 24 respectively emit laser beams or LED light beams in accordance with color image data input from a printer I/F (not shown; comprising a video I/F or high-speed serial communication I/F).

These laser beams or LED light beams respectively hit photosensitive drums 29, 30, 31, and 32 to form corresponding latent images thereon.

The latent image portions on these photosensitive drums 29, 30, 31, and 32 are applied with toner by developers 25, 26, 27, and 28 and are converted into toner images.

A recording sheet is fed from a paper cassette 41 or 42 at a timing synchronous with the beginning of irradiation of the laser beams or LED light beam, and is conveyed in turn to transfer units 33, 34, 35, and 36 by a conveyor belt 43, and the toner images formed on the photosensitive drums 29, 30, 31, and 32 are transferred onto the recording sheet.

The recording sheets on which the toner images were transferred is conveyed to a fixing unit 37, and the toner images are fixed on the recording sheet by heat and pressure applied by the fixing unit 37.

The recording sheet that has left the fixing unit 37 is exhausted by exhaust rollers 38. A sorter 53 sorts and stores the exhausted recording sheets on individual bins.

When a double-sided recording mode is set, the recording sheet that has exited the fixing unit 37 is temporarily conveyed to a convey path selector 39, and the direction of rotation of paper feed rollers is reversed to guide the recording sheet from the convey path selector 39 to a re-feed convey path 40.

When a multiple recording mode is set, the recording sheet is guided to the re-feed convey path 40 before the exhaust rollers 38.

The recording sheet guided to the re-feed convey path 40 is fed at the aforementioned timing, and is conveyed in turn to the transfer units 33, 34, 35, and 36 by the conveyor belt 43.

Figure 17:
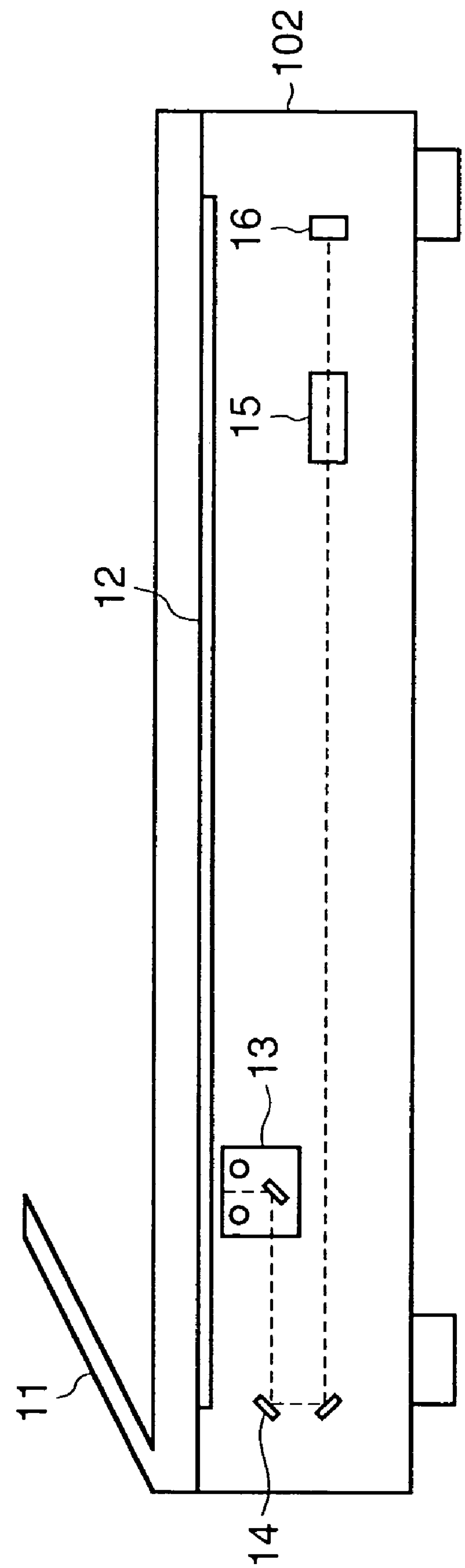
FIG. 17 is an explanatory view showing the structure of a mechanism of the image scanning device.
Figure 18:
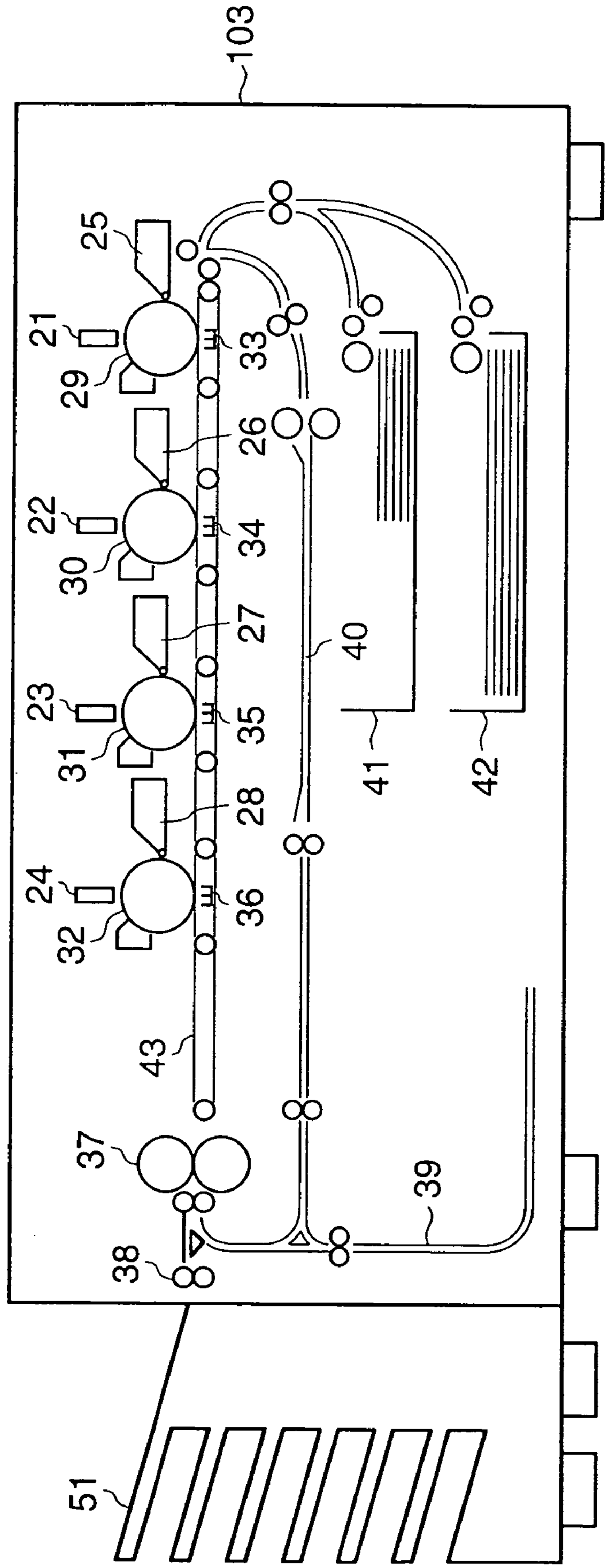
FIG. 18 is an explanatory view showing the structure of a mechanism of the image forming device.

In the descriptions of FIGS. 17 and 18, the image scanning device and image forming device are separately placed. Alternatively, the image scanning device and image forming device may be combined as an integrated unit. In such case, image data scanned by the image scanning device can be directly transferred to and copied by the image forming device, and the image scanning device and image forming device can also be used as standalone devices, respectively.

The system operation of the first embodiment will be explained below with reference to the flow charts shown in FIGS. 5 to 15.

<Operation of Computer>

(Command Process)

Figure 5:
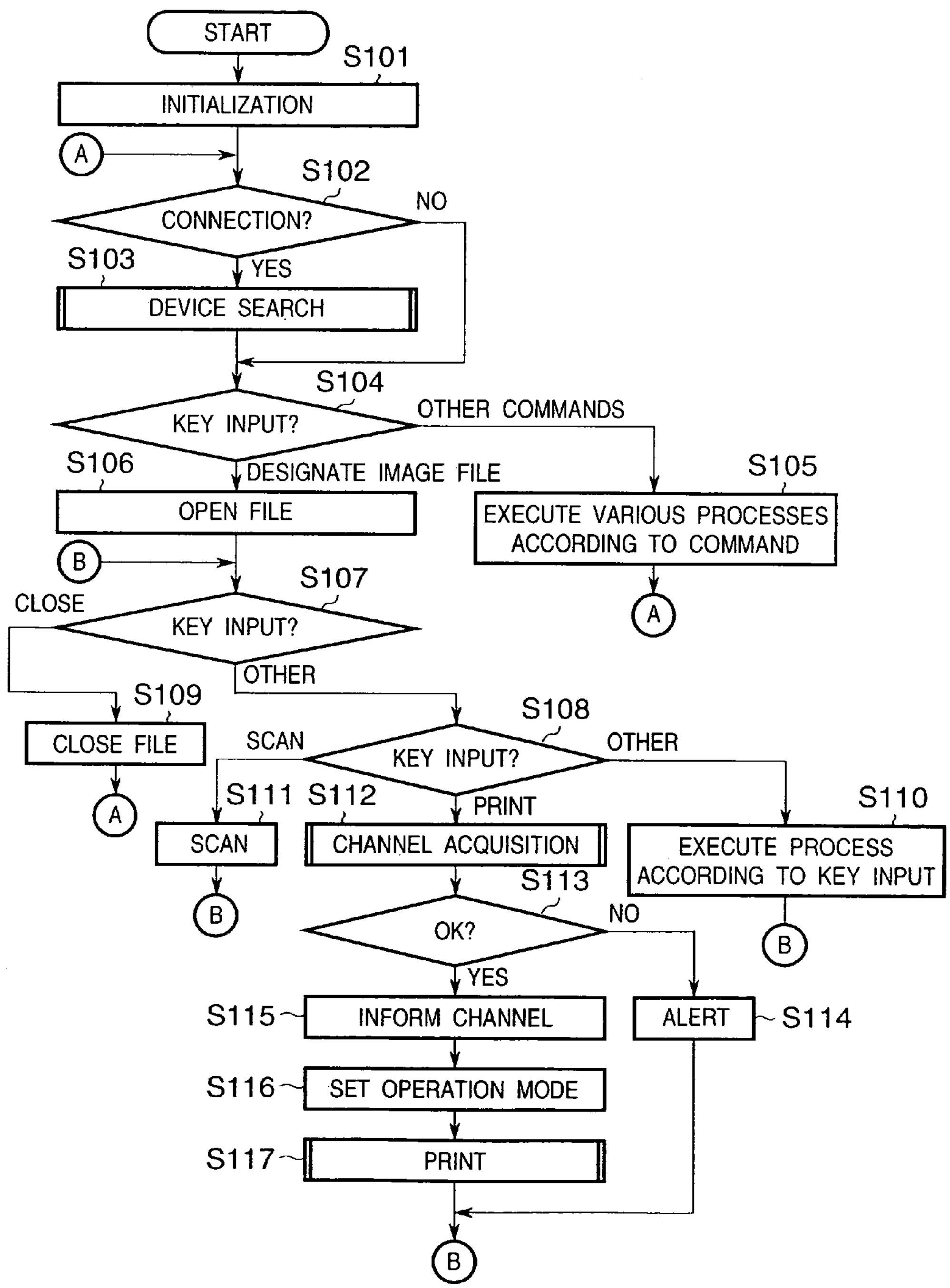
FIG. 5 is a flow chart showing the main routine of the computer in the first embodiment according to the present invention.

FIG. 5 is a flow chart showing the main routine of the computer 101. The operation of the computer 101 will be described below using FIG. 5.

Upon power ON of the computer 101, the CPU 201 initializes flags, registers, control variables, and the like, loads a control program such as an operating system or the like stored in a given area of the hard disk 214 onto the main memory 205, and then executes it by loading that program onto the cache memory 203 in units of predetermined sizes via the bus bridge system 204 having a memory controller function. The CPU 201 initializes the respective units of the computer 101 (S101).

If a new device including the computer 101 itself is connected to one of the high-speed serial communication I/Fs 104, 105, 106, and 107 (S102), the CPU 201 executes a device search process (S103). The device search process (S103) will be described later using FIG. 6.

If it is determined that the input by one of the keys, touch panel, digitizer, or the like of the console 215 is not a command input for designating and opening an image file to be printed but a command input or the like for executing another process (S104), the CPU 201 executes various processes corresponding to the input command (S105), and the flow returns to step S102 after execution of the process.

If it is determined that the input by one of the keys, touch panel, digitizer, or the like of the console 215 is the one for designating and opening an image file to be printed (S104), the CPU 201 loads the designated image file from the hard disk 214 or via the network 207 or the high-speed serial communication I/Fs 104 and 105, onto the main memory 205 (S106).

On the other hand, if it is determined that the input by the console 215 is neither a command input for printing the open image file nor a close command input for closing the open image file but a command input for executing another process (S107, S108), the CPU 201 executes various processes corresponding to the input (S110), and the flow returns to step S107 after execution of the process.

If the input by the console 215 is a close command for closing the open image file (S107), the CPU 201 closes the image file that has been loaded on the main memory 205, and releases the area of the main memory 205, which has become unnecessary (S109). At this time, if the contents of the image file have changed and must be saved, the file is saved in the hard disk 214 or via the network 207 or the high-speed serial communication I/Fs 104 and 105 as a new image file (S109).

If the input by the console 215 is a command for storing an image obtained by scanning an original by the image scanning device 102 in the open image file (S107, S108), the CPU 201 executes a scan process (S111) for receiving image data using one or a plurality of channels from the image scanning device 102, and the flow returns to step S107 after execution of the scan process. The scan process (S111) will be described in detail later using FIG. 8.

If the input by the console 215 is the one for printing the open image file (S107, S108), the CPU 201 executes a channel acquisition process (S112) for acquiring a required number of channels used in data transfer in isochronous transfer mode on the high-speed serial communication I/Fs 104 and 105 by the high-speed communication unit 208. The channel acquisition process (S112) will be described in detail later using FIG. 7.

If channel acquisition fails (S113), the CPU 201 generates a predetermined alert using an image, voice, or text on the display 211 (S114), and the flow then returns to step S107.

If channel acquisition is successful (S113), the CPU 201 informs the image forming device 103 of a number or numbers that identifies or identify the acquired channel or channels via the high-speed serial communication unit 208, high-speed serial communication connector 210, and high-speed serial communication I/F 105 using one-to-one asynchronous transfer such as asynchronous transfer mode (S115).

The CPU 201 sets the operation mode upon printing on the basis of the acquired channel or channels (S116).

Subsequently, the CPU 201 transfers image data to the image forming device 103 using the channel or channels of which the image forming device 103 was informed, and executes a print process (S117) using the image forming device 103. Upon completion of the print process, the flow returns to step S107. The print process (S119) will be described in detail later with reference to FIG. 9.

(Device Search Process)

Figure 6:
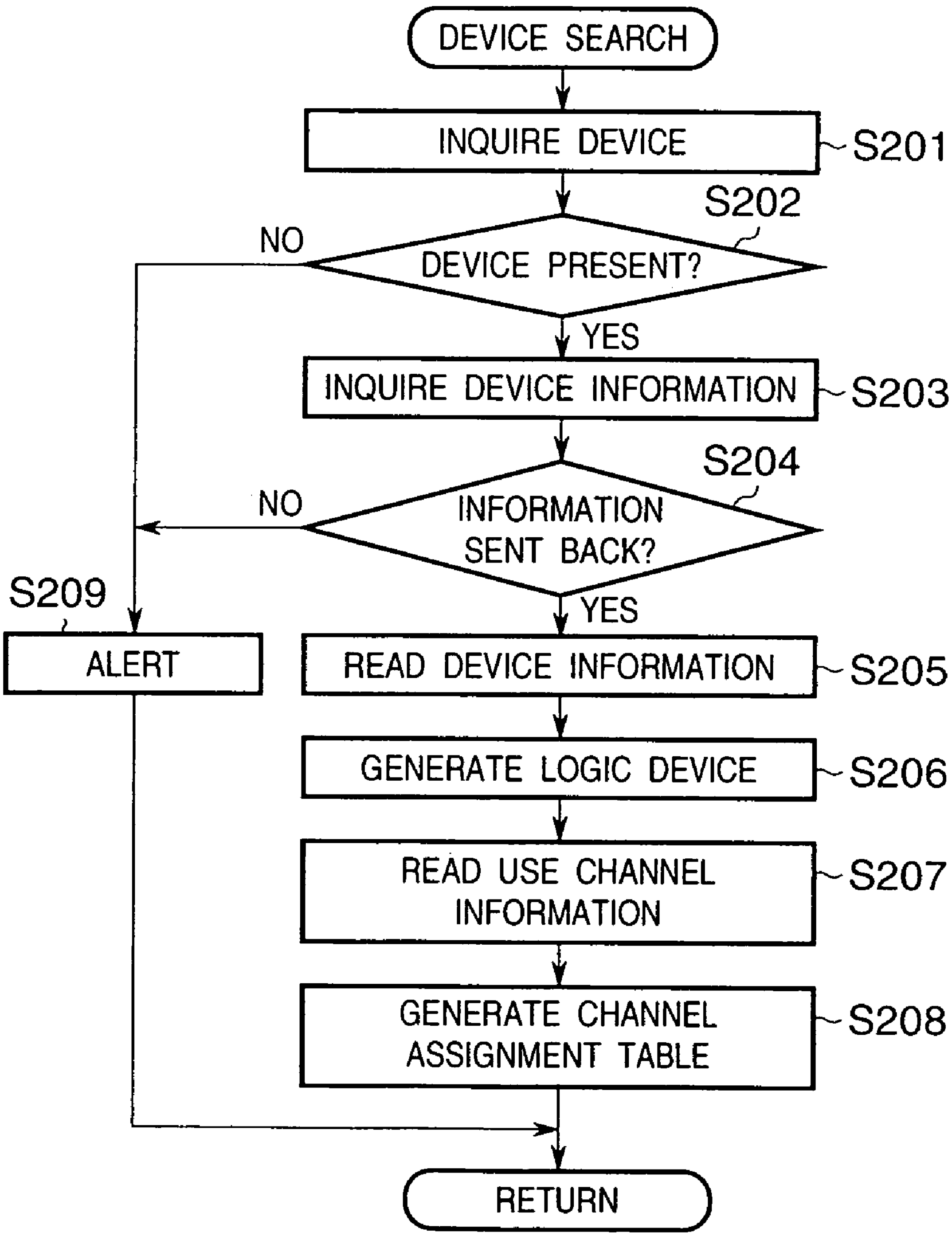
FIG. 6 is a flow chart showing the device search routine of the computer in the first embodiment.

FIG. 6 is a flow chart showing the details of the device search process in step S103 in FIG. 5.

The CPU 201 inquires of the high-speed serial communication unit 208 as to whether a new device connected to one of the high-speed serial communication I/Fs 104, 105, 106, and 107 is an image scanning device such as a scanner or the like which can scan and transmit image data, or an image forming device such as a printer or the like which can receive and print image data (S201).

If a scanner such as an image scanning device in question or a printer such as an image forming device in question, e.g., the image scanning device 102 or image forming device 103 is present on one of the high-speed serial communication I/Fs 104, 105, 106, and 107 (S202), the CPU 201 inquires device information (S203). If device information is sent back from the image scanning device 102 or image forming device 103 (S204), the CPU 201 saves the received device information on a given area of the main memory 205 (S205).

In case of a scanner such as an image scanning device or the like, the device information includes the resolution and number of lines of scanning elements, the types of color filters, the distance between neighboring scanning elements, a scanning speed, an offset correction amount between neighboring scanning elements, a white balance correction value, a shading correction value, operation mode information, and the like. On the other hand, in case of a printer such as an image forming device, the device information includes the number of photosensitive drums, the colors used in image formation, the distance between neighboring photosensitive drums, an image forming speed, a misregistration correction amount between neighboring photosensitive drums, operation mode information, and the like.

The CPU 201 generates a logic device corresponding to the image scanning device 102 or image forming device 103, which is used in the operating system to scan and receive image data or to transfer and print image data (S206).

Furthermore, the CPU 201 saves use channel information sent back from one or a plurality of generated logic devices in a given area of the main memory 205 (S207), and generates a channel assignment table on the basis of the received use channel information (S208), thus ending the device search process routine in step S103.

The use channel information includes the number of channels used by each device in data transfer in isochronous transfer mode. By looking up the channel assignment table, the numbers of channels and channel numbers used in units of devices can be detected. FIG. 16 shows an example of the channel assignment table. Note that FIG. 16 shows a list of the number of channels to be acquired in units of devices, but a list of channel numbers to be acquired in units of devices or a list including both the number of channels and channel numbers to be acquired may be used. FIG. 16 exemplifies a case wherein host C, scanner B, and two printers A and B are connected. Three channels are assigned to the scanner, and one channel is assigned to printer B.

If the device in question such as an image forming device or the like is not present on any of the high-speed serial communication I/Fs 104, 105, 106, and 107 (S202), or no device information is sent back (S204), the CPU 201 generates a predetermined alert using an image, voice, or text on the display 211 (S209), thus ending the device search process routine in step S103.

(Channel Acquisition Process)

Figure 7:
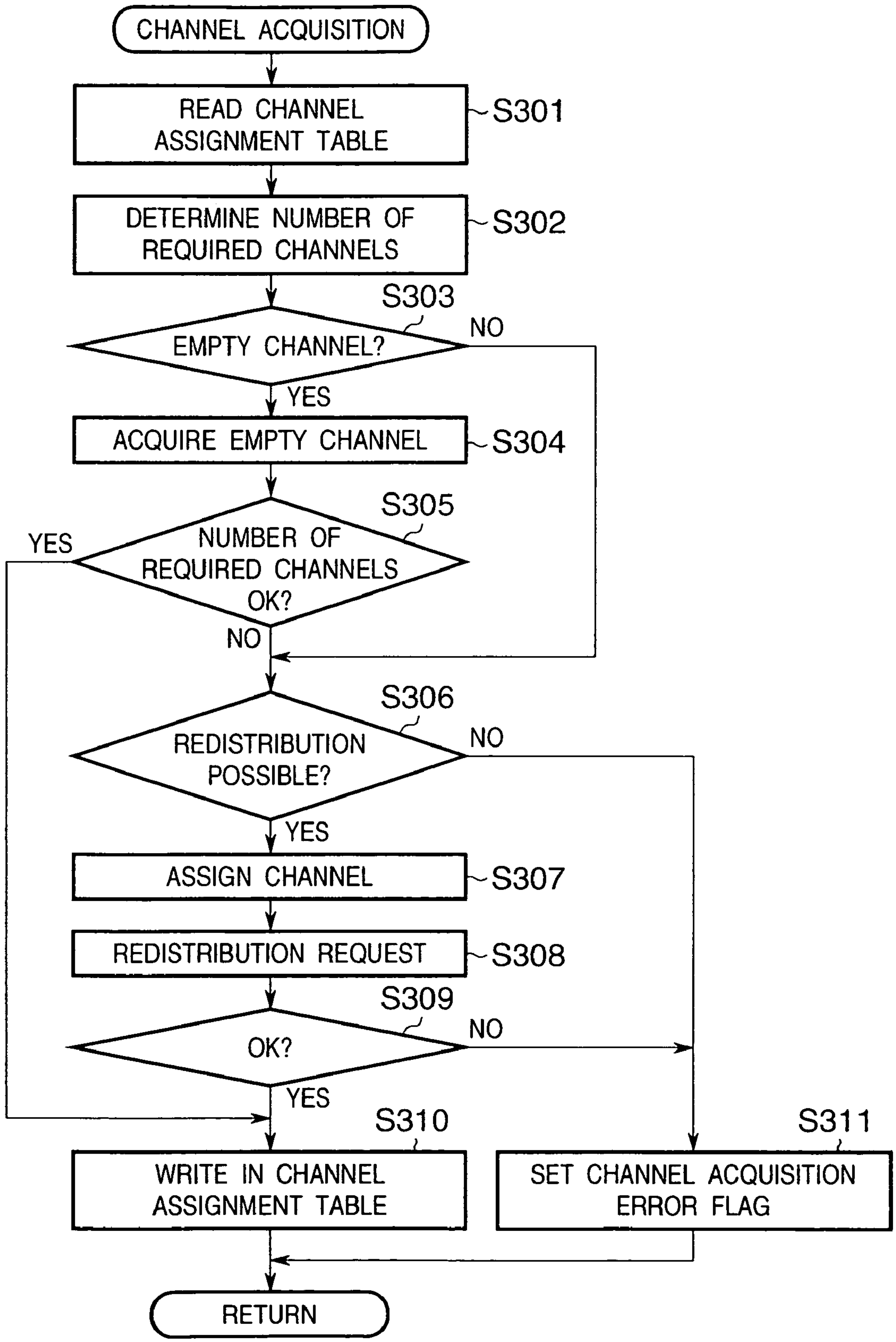
FIG. 7 is a flow chart showing the channel acquisition routine of the computer in the first embodiment.

FIG. 7 is a flow chart showing the details of the channel acquisition process in step S112 in FIG. 5.

The CPU 201 loads the channel assignment table saved in the area of the main memory 205 (S301), and determines the number of channels required for data transfer to a printer device in isochronous transfer mode in accordance with the contents of the channel assignment table (S302).

If there are empty channels which correspond in number to the determined number of channels (S303), the CPU 201 acquires empty channels the number of which corresponds to the required number of channels (S304). If empty channels which correspond in number to the number of required channels are not available (S303), the flow advances to step S306.

If the required number of channels can be assured (S305), the state after this channel assignment is written in the channel assignment table saved in the area of the main memory 205 to update the table (S310), thus ending the channel acquisition process routine in step S112.

If the required number of channels cannot be assured (S305), the CPU 201 checks based on the contents of the channel assignment table if channels assured by other devices include redistributable ones (S306).

For example, if a given scanner device has assured a channel and the operation of that scanner device can be temporarily paused, the channel assured by the scanner can be lent to another device while the device is being paused. For example, using the lent channel, data can be transferred to and printed by the printer device. In this manner, it is checked if the channels acquired by other devices include redistributable ones such as a channel which is not used at all, a channel which is not used at present, and the like.

If it is determined that channel redistribution is possible (S306), the CPU 201 assigns channels among devices including itself (S307), and issues a channel redistribution request to other devices in accordance with the assignment result (S308). If the CPU 201 receives a message that grants redistribution from another device (S309), it writes a state after redistribution in the channel assignment table to update that table (S310), thus ending the channel acquisition process routine in step S112.

On the other hand, if it is determined based on the contents of the channel assignment table that channel redistribution is impossible (S306), or if the CPU 201 does not receive any message that grants redistribution from other devices (S309), the CPU 201 sets a channel acquisition error flag (S311), thus ending the channel acquisition process routine in step S112.

With the above process, channels required for assuring a data transfer rate, which is necessary upon transferring data to the image forming device in isochronous mode, are assigned.

(Scan Process)

Figure 8:
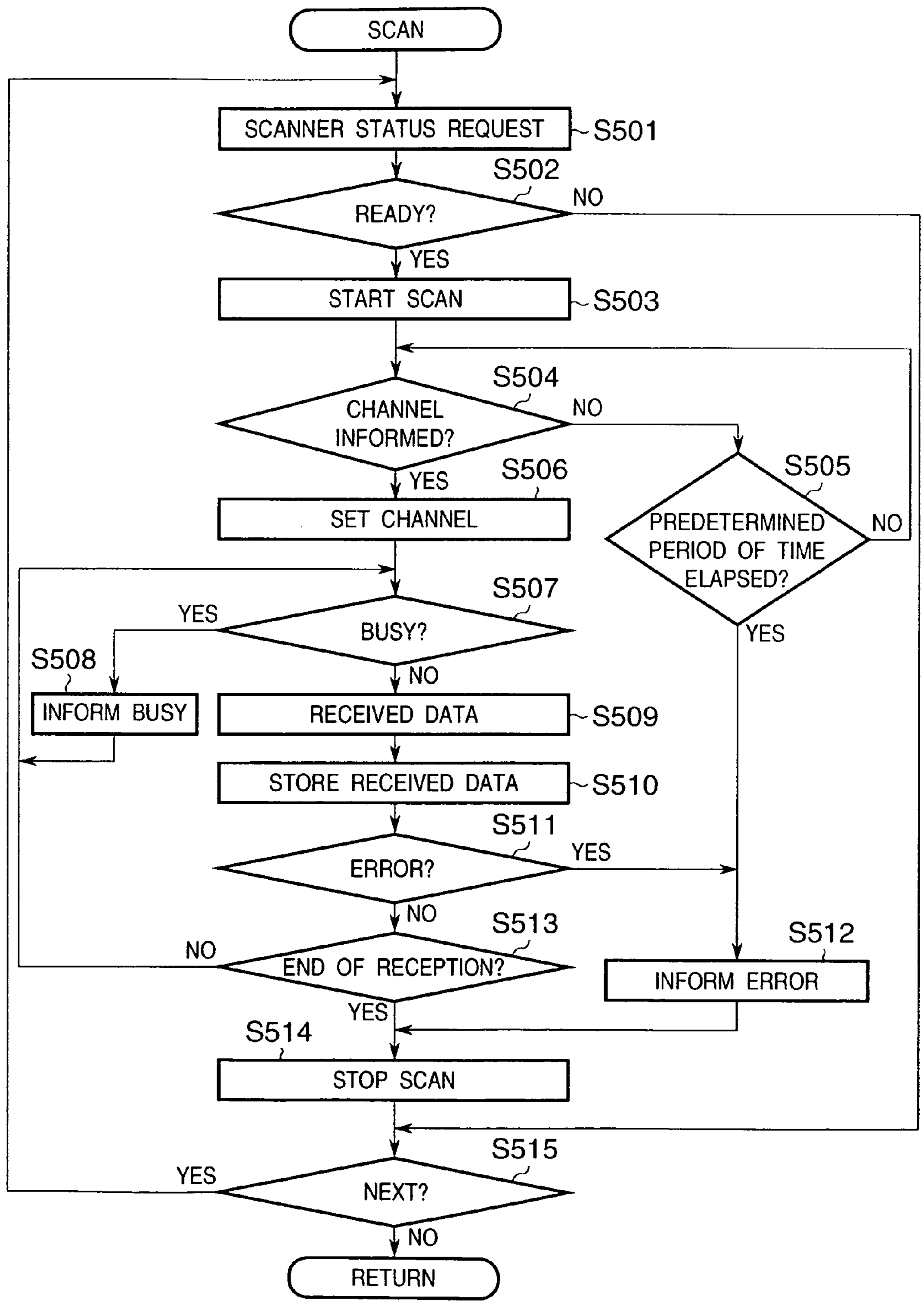
FIG. 8 is a flow chart showing the scan routine of the computer in the first embodiment.

FIG. 8 is a flow chart showing the details of the scan process in step Sill in FIG. 5.

The CPU 201 requests the image scanning device in question, e.g., the image scanning device 102, to output scanner status using asynchronous transfer mode via the high-speed serial communication I/Fs 104, 105, 106, and 107 using the high-speed serial communication unit 208 (S501).

If status of a READY state that indicates completion of preparation is sent back from the image scanning device 102 (S502), the CPU 201 sends a scan start command to the image scanning device 102 using asynchronous transfer mode (S503).

If status indicating a READY state is not sent back from the image scanning device 102 (S502), the flow advances to step S515.

If the CPU 201 receives a number or numbers that identifies or identify one or a plurality of channels which is or are acquired by the image scanning device 102 and used in isochronous transfer mode from the image scanning device 102 using asynchronous transfer mode via the high-speed serial communication I/Fs 104, 105, 106, and 107 (S504) within a predetermined period of time (S505), the CPU 201 saves the received number or numbers that identifies or identify the channels in a given area of the main memory 205, and makes predetermined setups required for receiving image data using isochronous transfer mode (S506).

If the CPU 201 is busy, i.e., it cannot receive data from the image scanning device 102 (S507), it sends busy status to the image scanning device 102 using asynchronous transfer mode (S508), and the flow returns to step S507.

If the CPU 201 is ready to receive data, it cancels busy status (S507). As a result, the image scanning device 102 begins to transmit image data in isochronous transfer mode, and the high-speed serial communication unit 208 begins to receive image data (S509). The CPU 201 sequentially stores the data received in isochronous transfer mode in a given area of the main memory 205 (S510).

If no error is detected in image data reception from the image scanning device 102 (S511), the flow returns to step S507 to continue a series of processes, until the CPU 201 receives the end of scan from the image scanning device 102 using asynchronous transfer mode (S513).

Upon receiving the end of scan from the image scanning device 102 (S513), the CPU 201 sends a scan stop command to the image scanning device 102 using asynchronous transfer mode (S514).

On the other hand, if the CPU 201 does not receive any number that identifies the channel which is acquired by the image scanning device 102 and used in isochronous transfer mode from the image scanning device 102 (S504) within a predetermined period of time (S505), or if errors have occurred in image data reception from the image scanning device 102 (S511), the CPU 201 sends error status to the image scanning device 102 using asynchronous transfer mode (S512), and subsequently sends a scan stop command to the image scanning device 102 using asynchronous transfer mode (S514).

If the next scan is to be subsequently done (S515), the flow returns to step S501 to repeat a series of processes.

(Print Process)

Figure 9:
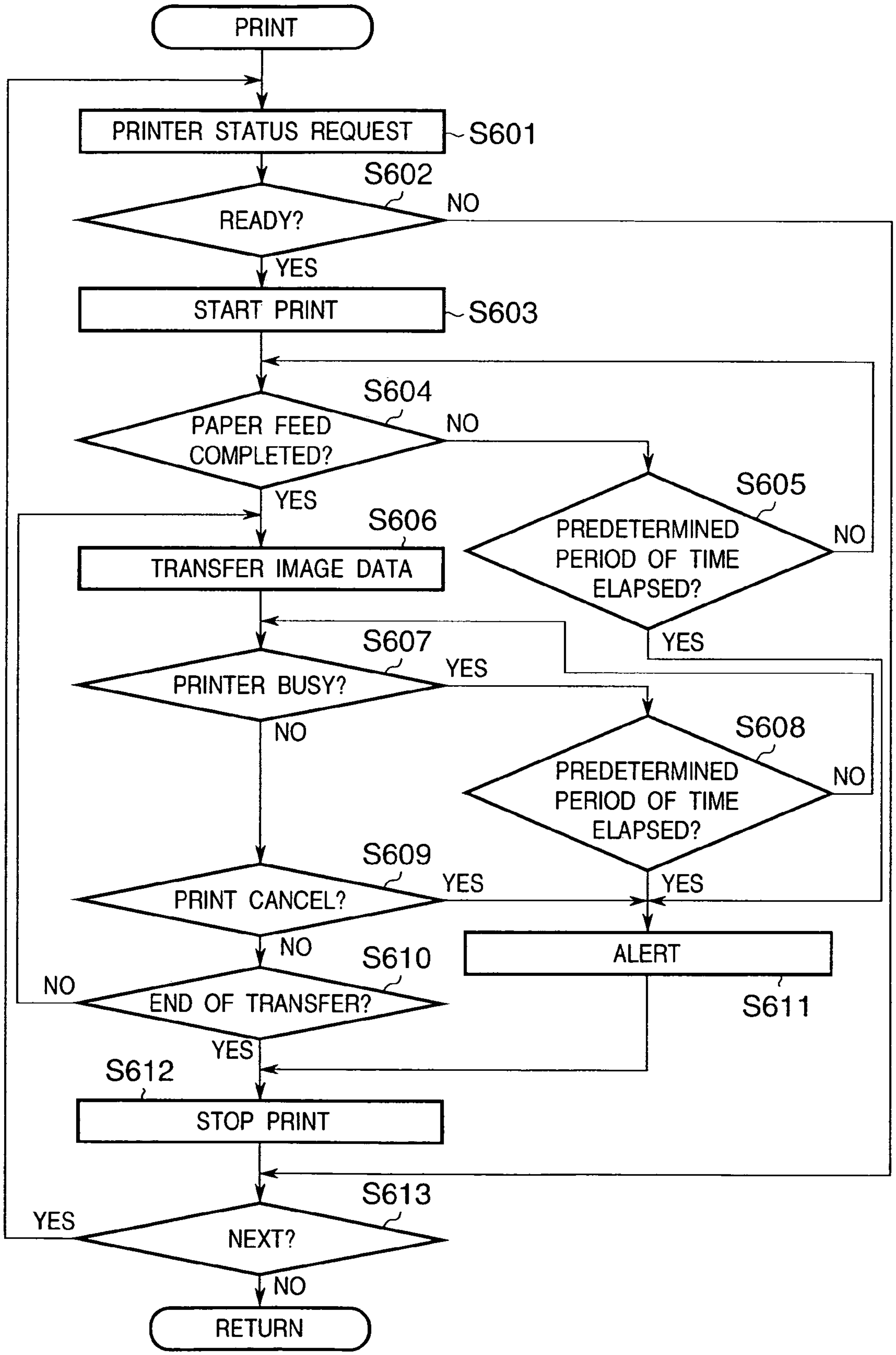
FIG. 9 is a flow chart showing the print routine of the computer in the first embodiment.

FIG. 9 is a flow chart showing the details of the print process in step S117 in FIG. 5.

The CPU 201 requests the image forming device in question, e.g., the image forming device 103, to output printer status using asynchronous transfer mode via the high-speed serial communication I/Fs 104, 105, 106, and 107 using the high-speed serial communication unit 208 (S601).

If status of a ready state indicating completion of preparation is sent back from the image forming device 103 (S602), the CPU 201 sends a print start command to the image forming device 103 using asynchronous transfer mode (S603). On the other hand, if status of a ready state is not sent back from the image forming device 103 (S602), the flow advances to step S613.

If a paper feed completion message is received from the image forming device 103 using asynchronous transfer mode (S604) within a predetermined period of time (S605), the CPU 201 begins to transfer image data to the image forming device 103 in isochronous transfer mode using the assured channel or channels (S606).

During transfer of image data in isochronous transfer mode, if a printer busy message is received from the image forming device 103 using asynchronous transfer mode (S607), and if a predetermined period of time has not elapsed yet (S608), image data transfer in isochronous transfer mode is temporarily paused.

If the printer remains busy even after an elapse of the predetermined period of time (S608), or if a print cancel command is input by the console 215 (S609), the CPU 201 generates a predetermined alert using an image, voice, or text on the display 211 (S611), and sends a print stop command to the image forming device 103, thus stopping print operation (S612).

If no print cancel command is input by the console 215 (S609), the flow returns to step S606 to repeat a series of processes until image data transfer is complete (S610).

Upon completion of image data transfer (S610), the CPU 201 sends a print stop command to the image forming device 103, thus stopping print operation (S612).

If the next print is to be subsequently done (S613), the flow returns to step S601 to repeat a series of processes. Otherwise (S613), the print process routine in step S117 ends.

<Operation of Image Scanning Device>

(Scan Process)

Figure 10:
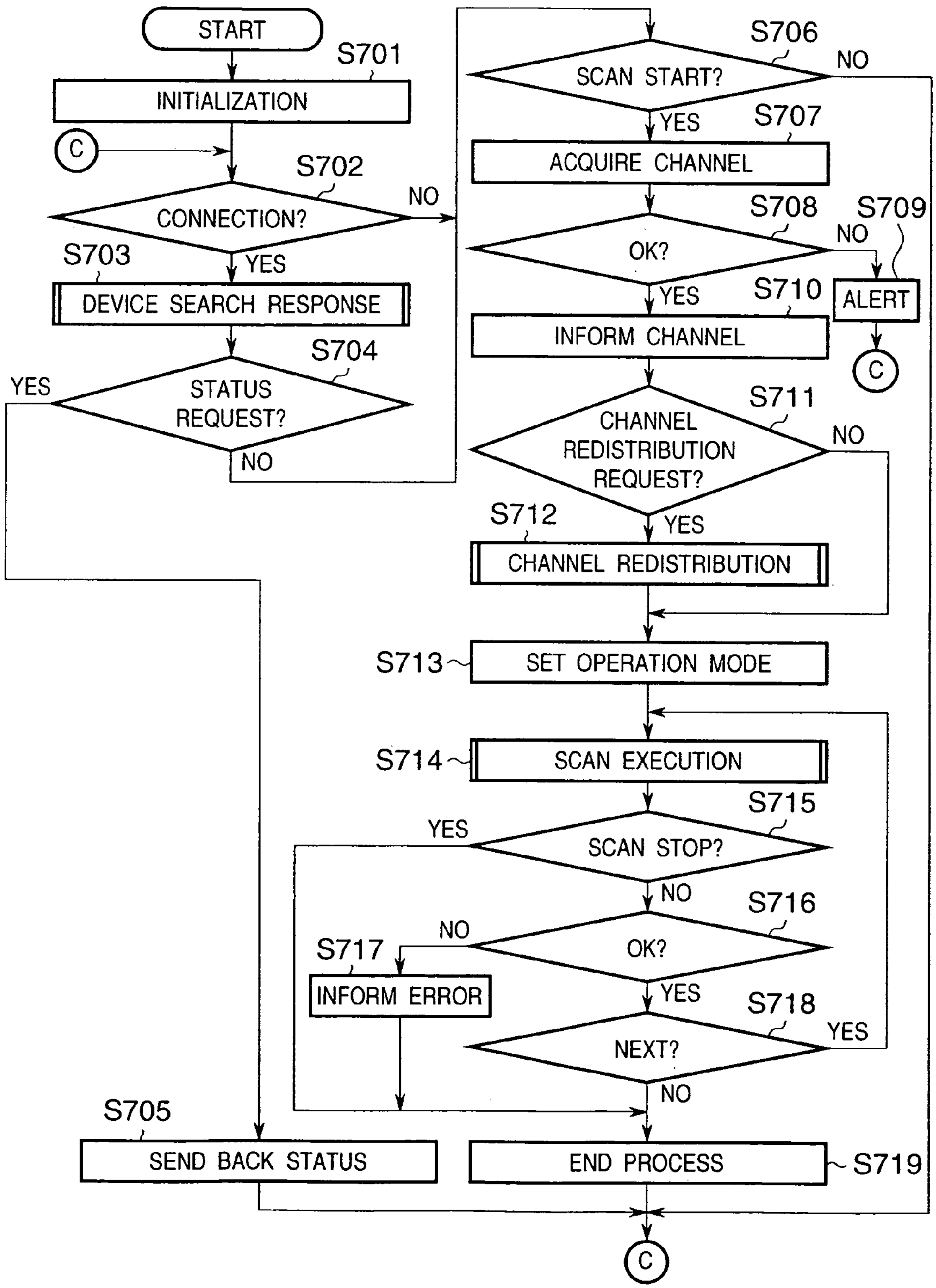
FIG. 10 is a flow chart showing the main routine of the image scanning device in the first embodiment.

FIG. 10 is a flow chart showing the main routine of the image scanning device 102. In this sequence, an image is scanned, and the scanned image data is sent to the computer 101.

Upon power ON of the image scanning device 102, the CPU 301 initializes flags, registers, control variables, and the like, executes a control program such as an operating system stored in a given area of the main memory 302, and initializes the respective units of the image scanning device 102 (S701).

If a new device including the image scanning device 102 is connected to one of the high-speed serial communication I/Fs 104, 105, 106, and 107 (S702), the CPU 301 executes a device search response process (S703). The device search response process (S703) will be described later using FIG. 11. If no new device is connected (S702), the flow advances to step S704.

If a command that requests printer status is received from the computer 101 via the high-speed serial communication I/Fs 105 and 106 (S704), the CPU 301 sends status to the computer 101 using asynchronous transfer mode (S705), and the flow returns to step S702.

If scan start is not directed by input operation at the console 305 or a command from the computer 101 (S706), the flow returns to step S702.

On the other hand, if scan start is directed by input operation at the console 305 or a command from the computer 101 (S706), the CPU 301 executes a channel acquisition process for acquiring the required number of channels used in isochronous transfer mode on the high-speed serial communication I/Fs 105 and 106 (S707).

If channel acquisition fails (S708), the CPU 301 generates a predetermined alert using an image, voice, or text on the display 304 (S709), and the flow returns to step S702. If scan start has been directed by a command from the computer 101, the CPU 301 sends error status to the computer 101 using asynchronous transfer mode (S709), and the flow returns to step S702.

If channel acquisition is successful (S708), the CPU 301 informs the computer 101 of a number or numbers that identifies or identify one or a plurality of acquired channels via the high-speed serial communication unit 308, high-speed serial communication connector 310, and high-speed serial communication I/F 105 in asynchronous transfer mode (S710).

If a channel redistribution request command is received from another device connected via the high-speed serial communication I/F, e.g., the computer 101, via the high-speed serial communication I/F 105 using asynchronous transfer mode (S711), the CPU 301 executes a channel redistribution process (S712) of the channel or channels acquired in the channel acquisition process (S707). The channel redistribution process (S712) will be described in detail later with reference to FIG. 12.

If no channel redistribution request is detected (S711), the flow advances to step S713.

The CPU 301 sets the operation mode in scan operation on the basis of the acquired channel or channels or the redistributed channel or channels if channel redistribution has been done (S713).

Subsequently, the CPU 301 transfers scanned image data to the computer 101 using the acquired channels or the redistributed channels, if channel redistribution has been done, of which the computer 101 is informed (S714).

The scan execution process will be described in detail later with reference to FIG. 13.

If scan operation is to be stopped in response to input operation at the console 305 or a command from the computer 101 (S715), a predetermined end process required in the image reading device 102 is done (S719), and the flow returns to step S702.

If an error is found in the scan execution process in step S714 (S716), the CPU 301 sends error status to the computer 101 using asynchronous transfer mode (S717), and a predetermined end process required in the image reading device 102 is done (S719). After that, the flow returns to step S702.

If no error is found in the scan execution process in step S714 (S716), and the next scan is to be executed subsequently (S718), the flow returns to step S714 to repeat a series of operations.

If the next scan need not be executed (S718), a predetermined end process required in the image reading device 102 is done (S719), and the flow then returns to step S702.

(Device Search Response Process)

Figure 11:
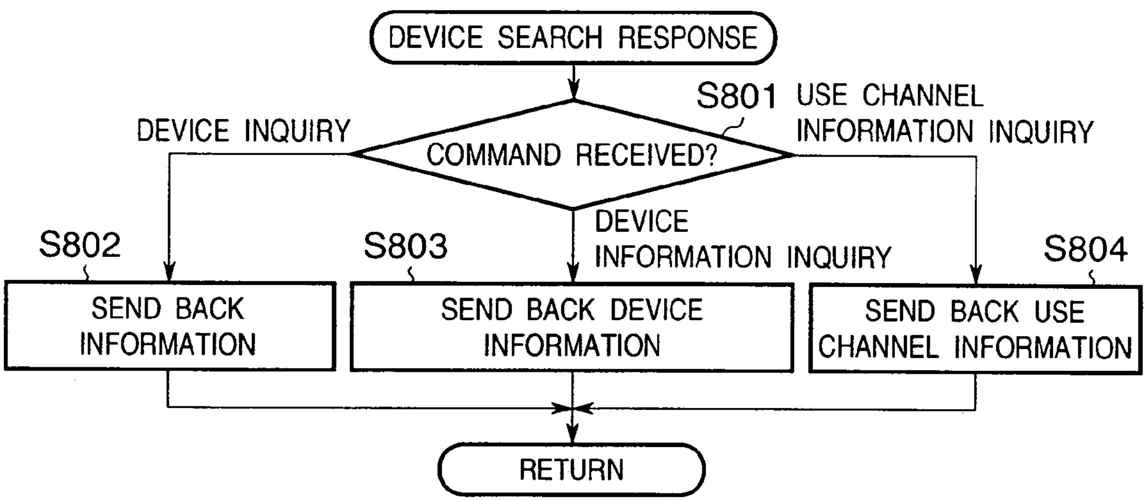
FIG. 11 is a flow chart showing the device search response routine of the image scanning device and image forming device in the first embodiment.
Figure 14:
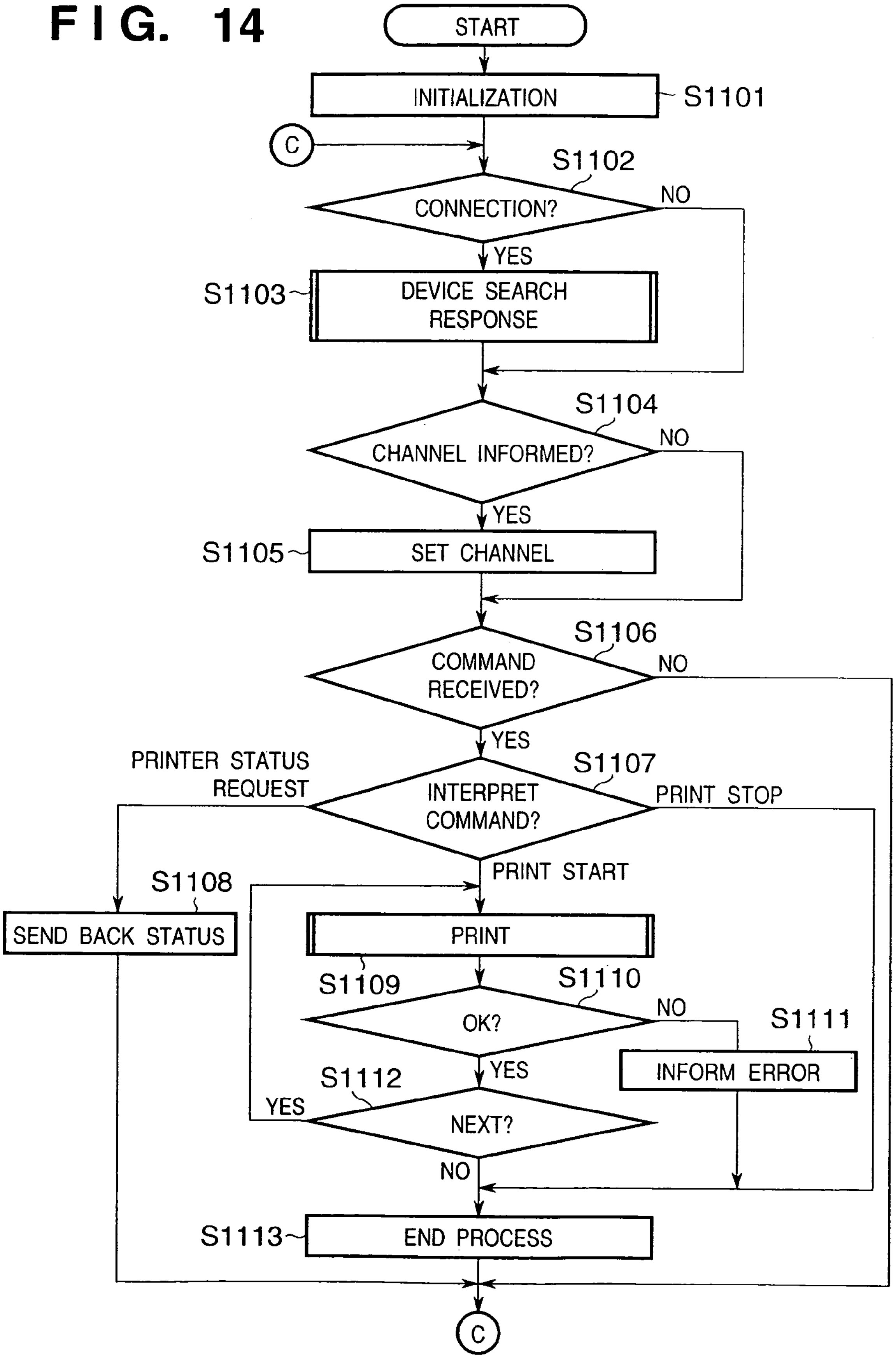
FIG. 14 is a flow chart showing the main routine of the image forming device in the first embodiment.

FIG. 11 is a flow chart showing the details of the device search response process in step S703 in FIG. 10 and in step S1103 in FIG. 14.

Upon receiving a command from the computer 101 using asynchronous transfer mode via the high-speed serial communication I/Fs 105 and 106, the CPU 301 or 401 interprets the received command (S801).

If the received command is a device inquiry command (S801), a message indicating acknowledgement is sent back to the computer 101 using asynchronous mode (S802), thus ending the device search response process routine in step S703 or S1103. The device inquiry command inquires as to whether or not the device in question is a scanner such as an image scanning device that can transfer scanned image data to the computer 101 or a printer such as an image forming device that can print image data transferred from the computer 101.

If the received command is a command that inquires device information (S801), device information is sent back to the computer 101 using asynchronous transfer mode (S803). In case of a scanner such as an image scanning device or the like, the device information includes the resolution and number of lines of scanning elements, the types of color filters, the distance between neighboring scanning elements, a scanning speed, an offset correction amount between neighboring scanning elements, a white balance correction value, a shading correction value, operation mode information, and the like. On the other hand, in case of a printer such as an image forming device, the device information includes the number of photosensitive drums, the colors used in image formation, the distance between neighboring photosensitive drums, an image forming speed, a misregistration correction amount between neighboring photosensitive drums, operation mode information, and the like.

After device information is sent back (S803), the device search response process routine in step S703 or S1103 ends.

If the received command is a command that inquires use channel information (S801), use channel information is sent back to the computer using asynchronous transfer mode (S804). This use channel information informs the number of channels used by each device in data transfer on a high-speed serial I/F such as isochronous transfer mode whose data transfer cycles are guaranteed.

After the use channel information is sent back (S804), the device search response process routine in step S703 or S1103 ends.

(Channel Redistribution Process)

Figure 12:
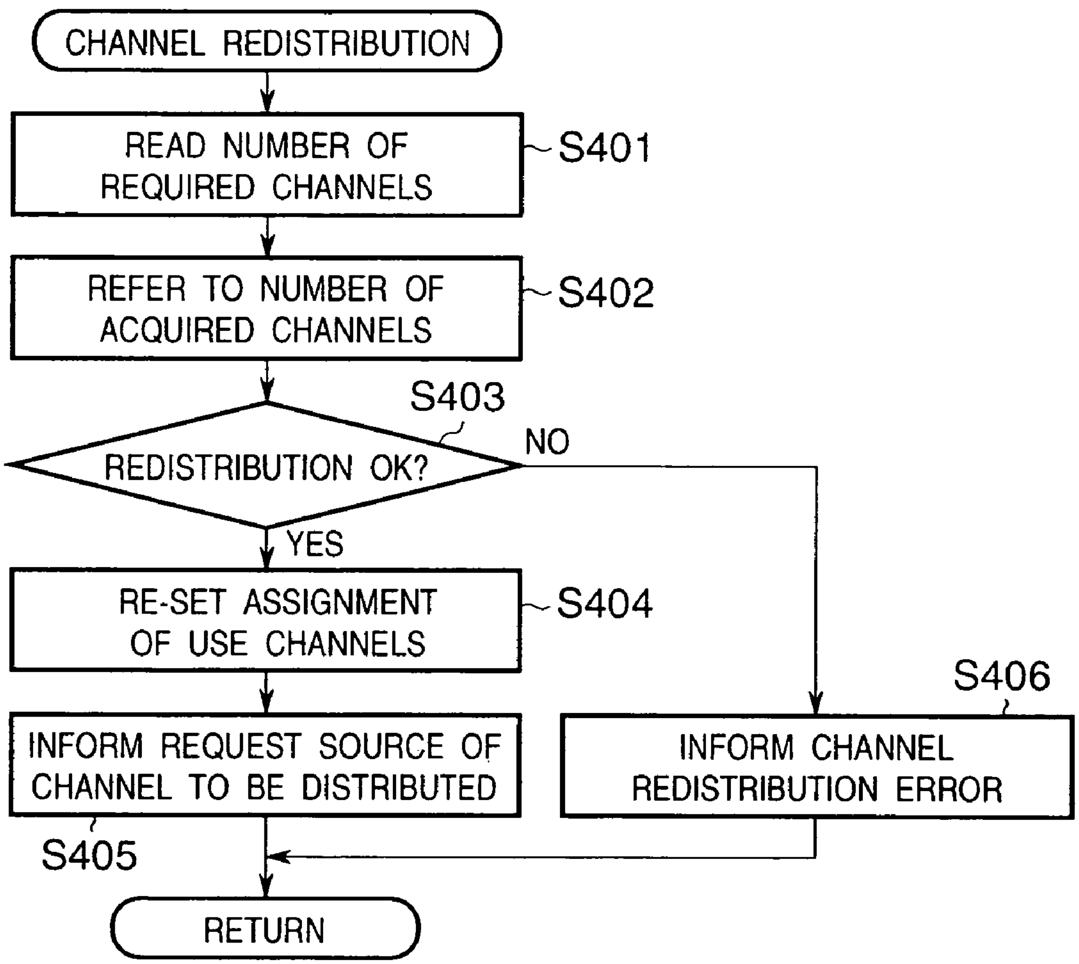
FIG. 12 is a flow chart showing the channel redistribution routine of the image scanning device in the first embodiment.

FIG. 12 is a flow chart showing the details of the channel redistribution process in step S712 in FIG. 10.

The CPU 301 reads the number of requested channels from information appended to the channel redistribution request command supplied from another device connected via the high-speed serial communication I/F, e.g., the computer 101, using asynchronous transfer mode via the high-speed serial communication I/F 105 (S401), and refers to the number of channels acquired in step S707 (S402).

If it is determined as a result of consideration of the combination of the number of acquired channels and operation mode that redistribution is impossible (S403), the CPU 301 informs the computer 101 of a channel redistribution error (S406), and ends the channel redistribution process routine in step S712.

On the other hand, if it is determined as a result of consideration of the combination of the number of acquired channels and operation mode that redistribution is possible (S403), the CPU 301 reassigns use channels (S404). In this way, the CPU 301 assures channels required for executing a newly set operation mode, and can provide one or a plurality of channels that can be lent as a result of redistribution to the request source.

The CPU 301 informs the request source device, e.g., the computer 101, of a channel number or numbers to be distributed (S405), and ends the channel redistribution process routine in step S712.

(Determine Redistribution Possibility)

Whether or not redistribution is possible is determined in consideration of the number of channels redistribution of which is requested, and the number of channels that the image scanning device can currently lend. If the number of requested channels is smaller than that which can be lent, it is determined that redistribution is possible. The channels that can be lent include a channel which has been assured but is not in use currently, an extra channel, and the like. For example, when the image scanning device 102 transmits image data to the computer 101, a transfer rate corresponding to the resolution and scan speed of the image scanning units must be assured so as to transmit image data from the image scanning units 341 to 343 via the image processing units 331 to 333 in real time. For this reason, channels enough to realize that transfer rate must be assured. However, when the hard disk 303 is used as a buffer, and the scanned image is temporarily stored in the hard disk and is then transferred, the image data can be transmitted even when the transfer rate drops. For this reason, even when a real-time mode requires 3 channels, a buffering mode can be implemented using only one channel.

Such situation takes place also in image processes. For example, assume that a reduction mode for reducing the scanned image to ½ in the vertical and horizontal directions by the image processing units 331 to 333 is set. In this case, the transfer rate can be ¼ that of normal image data. In addition, if a function of encoding image data is prepared in the image processing units or the communication unit 308, the required transfer rate varies depending on the encoding level. If a non-encoding mode that does not encode data at all, a reversible compression mode for reducing the image data size to nearly ½ by reversible compression, an irreversible compression mode for reducing the image data size to roughly 1/10 by irreversible compression, and the like are prepared as the encoding function, the required transfer rate also varies depending on the compression mode used. For example, even when the non-compression mode requires 3 channels, the reversible compression mode requires only 2 channels, and the irreversible compression mode requires only one channel.

In this fashion, the number of required channels varies depending on the operation mode of the image scanning device.

For example, assume that the image scanning device 102 has unconditionally assured a maximum number of required channels (3 channels in the above example). Upon reception of a redistribution request, the actually required transfer rate is calculated in consideration of the aforementioned operation mode. If the difference between the number of channels required for assuring that transfer rate and the number of assured channels is equal to or larger than the number of requested channels, the channel redistribution request is accepted, and the channels are redistributed to inform the redistribution request source of an extra channel number or numbers.

(Scan Execution Process)

Figure 13:
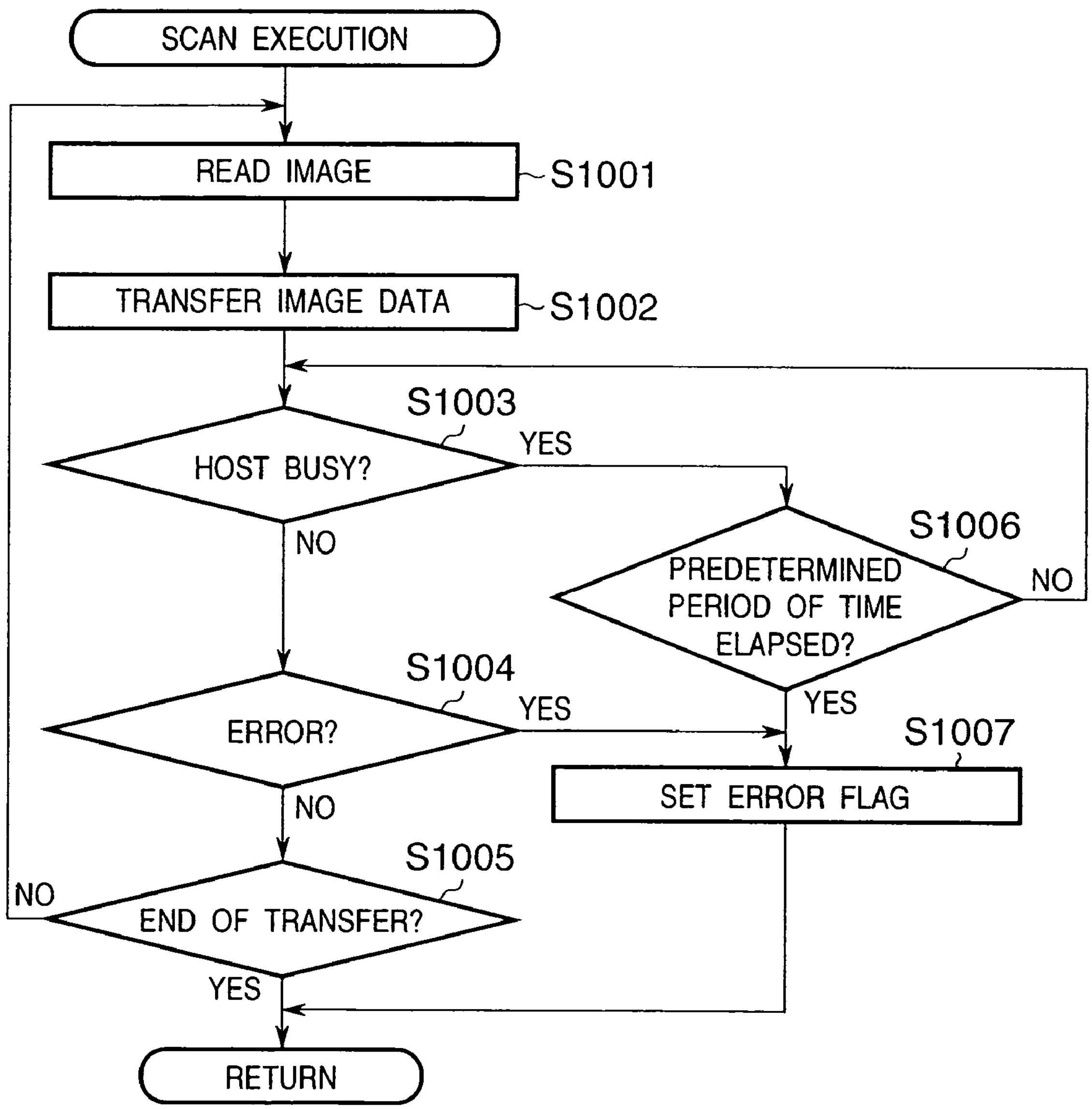
FIG. 13 is a flow chart showing the scan execution routine of the image scanning device in the first embodiment.

FIG. 13 is a flow chart showing the details of the scan execution process in step S714 in FIG. 10.

The CPU 301 scans an original image using the image scanning units 341, 342, and 343 (S1001), and sends the respective scanned color image data to the image processing units 331, 332, and 333.

The image processing units 331, 332, and 333 execute predetermined image processes such as shading correction, white balance correction, masking correction, and the like and, after that, the CPU 301 transfers the processed image data to the computer 101 in isochronous transfer mode via the high-speed serial communication unit 308, high-speed serial communication connector 309, and high-speed serial communication I/F 105 (S1002).

If host busy is not canceled by a host busy cancel command or the like sent from the computer 101 using asynchronous transfer mode (S1003) within a predetermined period of time (S1006), the CPU 301 sets an error flag (S1007), and ends the scan execution process routine in step S714.

If the CPU 301 receives the host busy cancel command sent from the computer 101 using asynchronous transfer mode (S1003), and image data transfer is being executed normally (S1004), the flow returns to step S1001, and the CPU 301 repeats a series of operations until image data transfer is finished.

If an error has occurred during image data transfer to the computer 101 (S1004), the CPU 301 sets an error flag (S1007), thus ending the scan execution process routine in step S714.

Upon completion of image data transfer (S1005), the scan execution process routine in step S714 ends.

<Operation of Image Forming Device>

(Print Operation)

FIG. 14 is a flow chart showing the main routine of the image forming device 103 of this embodiment. The operation of the image forming device 103 will be explained below using FIG. 14.

Upon power ON of the image forming device 103, the CPU 401 initializes flags, registers, control variables, and the like, executes a control program such as an operating system stored in a given area of the main memory 402, and initializes the respective units of the image forming device 103 (S1101).

If a new device including the image forming device 103 is connected to one of the high-speed serial communication I/Fs 104, 105, 106, and 107 (S1102), the CPU 401 executes a device search response process in step S1103. The details of the device search response process in step S1103 are as has already been described above with reference to FIG. 11. If no new device is connected (S1102), the flow advances to step S1104.

If the CPU 401 receives a number or numbers that identifies or identify one or a plurality of channels, that have been acquired by the computer 101 and are used in isochronous transfer mode, from the computer 101 via the high-speed serial communication I/Fs 105 and 106 using asynchronous transfer mode (S1104), it saves the received channel identification number or numbers in a given area of the main memory 402, and makes predetermined setups required for receiving image data using isochronous transfer mode (S1105). If no channel identification number is received (S1104), the flow advances to step S1106.

Upon receiving a command from the computer 101 using asynchronous transfer mode via the high-speed serial communication I/Fs 105 and 106 (S1106), the CPU 401 interprets the received command (S1107). If the received command is the one that requests printer status (S1107), the CPU 401 sends that status to the computer 101 using asynchronous transfer mode (S1108), and the flow returns to step S1102.

If the received command is the one indicating print start (S1107), the CPU 401 executes a print process in step S1109. The print process in step S1109 will be described in detail later using FIG. 15.

If an error has occurred in the print process in step S1109 (S1110), the CPU 401 sends error status to the computer 101 using asynchronous transfer mode (S1111), and executes a predetermined end process required in the image forming device 103 (S1113). After that, the flow returns to step S1102.

If no error is found in the print process in step S1109 (S1110), and the next print is to be executed subsequently (S1112), the flow returns to step S1109 to repeat a series of operations.

If the next print need not be executed (S1112), the CPU 401 executes a predetermined end process required in the image forming device 103 (S1113), and the flow then returns to step S1102.

(Print Process)

Figure 15:
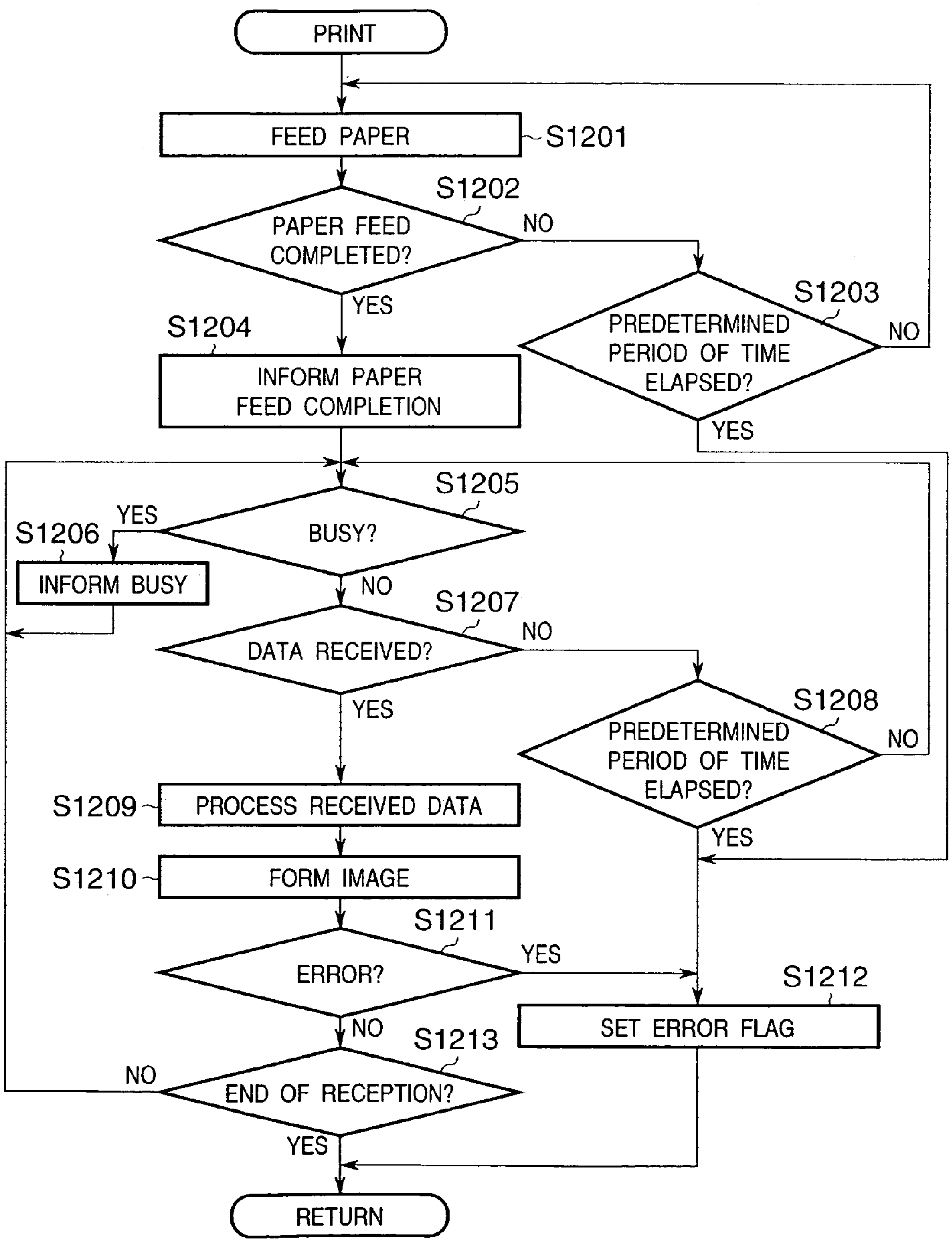
FIG. 15 is a flow chart showing the print routine of the image forming device in the first embodiment.

FIG. 15 is a flow chart showing the details of the print process in step S1109 in FIG. 14.

The CPU 401 executes a paper feed process for picking up and feeding a recording paper sheet from the paper cassette 41 or 42 so as to convey the recording paper sheet in turn to the transfer units 33, 34, 35, and 36 of the image forming device 103 (S1201).

The leading end of the fed recording paper sheet is registered by registration rollers inserted in front of the first transfer unit 33. At this time, a paper detector detects that paper feeding is complete, and informs the CPU 401 of that status.

If completion of paper feeding is detected (S1202) within a predetermined period of time (S1203), the CPU 401 sends a paper feed completion message to the computer 101 via the high-speed serial communication I/Fs 105 and 106 using asynchronous transfer mode (S1204). If completion of paper feeding is not detected (S1202) within a predetermined period of time (S1203), the CPU 401 sets an error flag (S1212), and ends the print process routine in step S1109.

If a busy state in which data reception is disabled is detected, the CPU 401 sends busy status to the computer 101 using asynchronous transfer mode (S1206), and the flow returns to step S1205.

If the computer 101 begins to transmit image data in isochronous transfer mode (S1207) within a predetermined period of time (S1208), the high-speed serial communication unit 408 begins to receive that image data. The image data reception is done via the high-speed serial communication I/Fs 105 and 106, high-speed serial communication connector 409, and high-speed serial communication unit 408 using one or a plurality of channels acquired by the computer 101 so as to attain data transfer whose data transfer cycles are guaranteed.

Upon receiving image data in isochronous transfer mode (S1207), the CPU 401 sends the received image data from the high-speed serial communication unit 408 to the image processing units 431, 432, 433, and 434 to execute predetermined image processes of the received image data (S1209). Then, the CPU 401 forms an image using the image forming units 441, 442, 443, and 444 (S1210).

Upon image formation, if paper jam or the like takes place (S1211), the CPU 401 sets an error flag (S1212), and ends the print process routine in step S1109.

If image data reception is continued (S1213), the flow returns to step S1205 to repeat a series of processes.

Upon completion of image data reception (S1213), the print process routine in step S1109 ends.

As described above, in a system which connects a plurality of devices using a communication scheme that can change the bandwidth depending on the number of channels used like isochronous mode of an IEEE1394 serial bus, a device such as an image scanning device, the required bandwidth of which changes depending on the operation mode lends a channel to another device as needed, thus preventing data transfer from being disabled due to an insufficient number of channels. In this way, each individual device can assure a required number of channels, and reliable data transfer can be guaranteed.

<Variation of First Embodiment>

In the description of the first embodiment, one each of the computer 101, image scanning device 102, and image forming device 103 are connected to the high-speed serial communication I/Fs 104, 105, 106, and 107. Also, one or a plurality of computers, image scanning devices, and image forming devices may be connected.

Furthermore, one or a plurality of devices other than the computer 101, image scanning device 102, and image forming device 103 may be connected to the high-speed serial communication I/Fs 104, 105, 106, and 107.

In such case, channels can be dynamically redistributed between the connected devices on high-speed serial communication I/Fs.

In the description of the first embodiment, image data is transferred from the image scanning device 102 to the computer 101. Alternatively, image data may be temporarily transferred from the image scanning device to a server, and then transferred from the server to the computer.

On the other hand, after the computer transfers an image scanning command to the server, image data may be transferred from the image scanning device to the server.

In such cases, a series of processes described as those to be done between the image scanning device and computer in the embodiment of the present invention may be implemented between the image scanning device and server.

In the description of the first embodiment, image data is transferred from the computer to the image forming device 103. Alternatively, after image data is temporarily transferred from the computer to the server, that image data may be transferred from the server to the image forming device.

Also, after the computer transfers an image forming command to the server, the server may transfer image data to the image forming device.

In such cases, a series of processes described as those to be done between the computer and image forming device in the first embodiment may be implemented between the server and image forming device. Also, an arrangement for directly transferring image data from the image scanning device to the image forming device may be included. For example, when a plurality of combinations of image scanning devices and image forming devices are connected to high-speed serial communication I/Fs, channels on the high-speed serial communication I/Fs can be dynamically redistributed in units of combinations.

Even when a computer and other devices are connected to the combinations of image scanning devices and image forming devices, channels on the high-speed serial communication I/Fs can also be dynamically redistributed.

[Second Embodiment]

An image processing system in the second embodiment has the same arrangement as that in the first embodiment shown in FIG. 1. The computer 101 has the arrangement shown in FIG. 2, the image scanning device 102 has the arrangement shown in FIGS. 3 and 17, and the image forming device 103 has the arrangement shown in FIGS. 4 and 18. The image processing system of this embodiment is different from that in the first embodiment in a procedure for acquiring channels.

The print operation in the image processing system of this embodiment will be explained below with reference to FIGS. 19A to 28.

<Main Process in Computer 101>

Figure 19A:
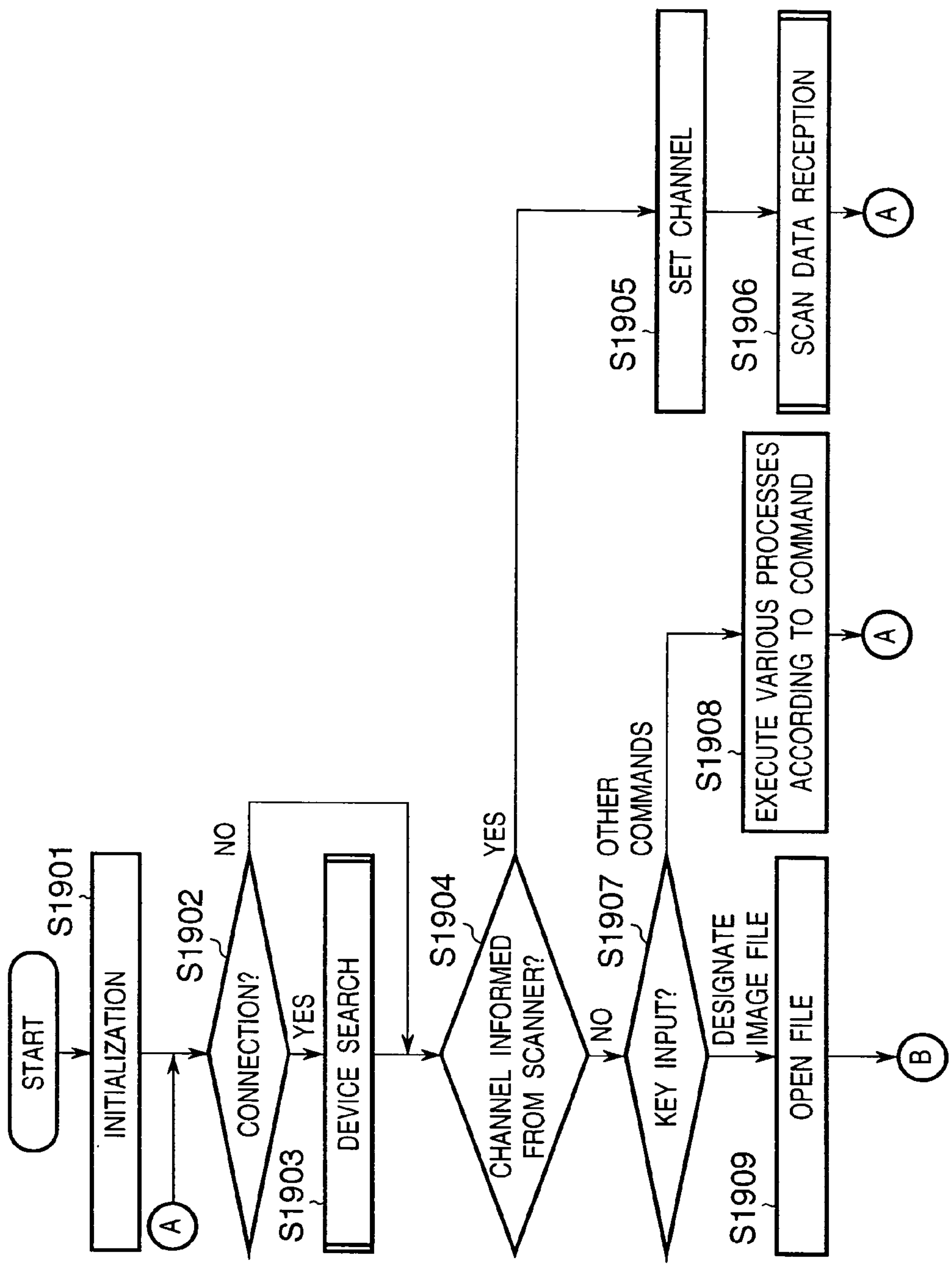
FIGS. 19A–19B are flow charts showing the main routine of the computer in the second embodiment according to the present invention.
Figure 19B:
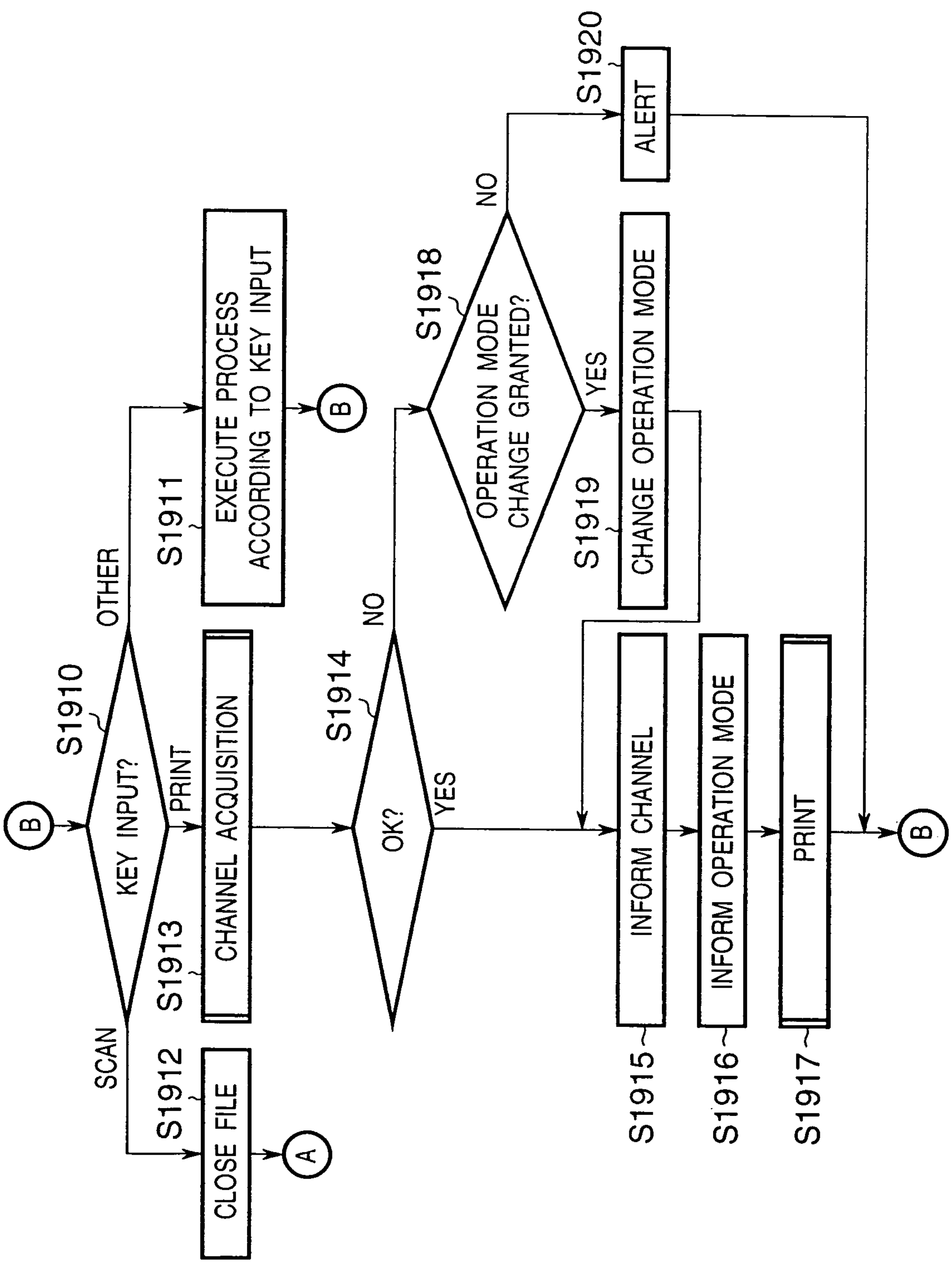

FIGS. 19A–19B are flow charts showing the main routine upon executing a print process in the computer 101 of this embodiment. The print operation in the computer 101 will be explained below with reference to FIGS. 19A–19B.

In step S1901, upon power ON of the computer 101, the control unit 201 initializes flags, registers, control variables, and the like, and loads a control program such as an OS or the like stored in a given area of the second storage unit 205 onto the first storage unit 203 in units of predetermined volumes via the bus bridge system 204 having a memory controller function. The control unit 201 initializes the respective units of the computer 101.

It is checked in step S1902 if a new device including the computer 101 itself is connected to one of the high-speed serial communication I/Fs 104, 105, 106, and 107. If YES in step S1902, the flow advances to step S1903 to execute a device search process. The device search process in step S1903 will be described in detail later with reference to the flow chart in FIG. 20.

If the control unit 201 receives a number or numbers that identifies or identify one or a plurality of channels, which have been acquired by the image scanning device 102 and are used in isochronous transfer mode, from the image scanning device 102 via the high-speed serial communication I/Fs 104, 105, 106, and 107 in asynchronous transfer mode in step S1904, the flow advances to step S1905 to save the received channel identification number or numbers in a given area of the second storage unit 205 and to make predetermined setups required for receiving image data using isochronous transfer mode. After that, the control unit 201 executes a scan data reception process for receiving image data from the image scanning device 102 using isochronous transfer mode, and storing the received image data in a given area of the second storage unit 205 in step S1906. The scan data reception process in step S1906 will be described in detail later with reference to the flow chart in FIG. 21.

If it is determined in step S1107 that the input by one of the keys, touch panel, digitizer, or the like of the console 215 is not a command input for designating and opening an image file to be printed but a command input or the like for executing another process, the flow advances to step S1908 and the control unit 201 executes various processes corresponding to the input command. Upon completion of execution of the various processes, the flow returns to step S1902. On the other hand, if it is determined in step S1907 that an input for designating an image file is detected, the flow advances to step S1909, and the control unit 201 loads the designated image file from the third storage unit 214 or via the network 207 or the high-speed serial communication I/Fs 104 and 105, onto the second storage unit 205.

If the control unit 201 determines in step S1910 that the input by the console 215 is neither a command input for printing the open image file nor a close command input for closing the open image file but a command input for executing another process, the control unit 201 executes various processes corresponding to the input in step S1911, and the flow returns to step S1910. On the other hand, if the input for closing the open image file is detected in step S1910, the flow advances to step S1912, and the control unit 201 closes the image file that has been loaded on the second storage unit 205 and releases the area of the main memory 205, which has become unnecessary. At this time, if the contents of the image file have changed and must be saved, the file is saved in the third storage unit 214 or via the network 207 or the high-speed serial communication I/Fs 104 and 105 as a new image file.

If an input for printing the open image file is detected in step S1910, the flow advances to step S1913, and the control unit 201 acquires a required number of channels whose data transfer cycles are guaranteed like isochronous transfer mode on the high-speed serial communication I/Fs 104 and 105 by the high-speed communication unit 208. The control unit 201 checks in step S1914 if the channel acquisition is successful. If the channel acquisition is successful, the flow advances to step S1915; if any error has occurred, e.g., if the required number of channels cannot be assured, the flow advances to step S1918.

In step S1918 the control unit 201 checks based on information which pertains to the image forming device 103 acquired in advance by the device search process in step S1903 if the operation mode of the image forming device 103 can be changed. If the operation mode cannot be changed, the control unit 201 generates a predetermined alert using an image, voice, or text on the display 211 in step S1920, and the flow then returns to step S1910. On the other hand, if the operation mode can be changed, the control unit 201 changes the operation mode of the image forming device 103 in step S1919, and the flow advances to step S1915.

In this embodiment, the operation mode of the image forming device 103 can be changed by changing, for example, the print speed, print image quality, and the like in correspondence with the number of acquired channels. Such change in operation mode can change the size of image data to be transferred in unit time from the computer 101 to the image forming device 103. Hence, when the number of acquired channels is small, the operation mode of the image forming device 103 is changed to limit the image data transfer rate, even when an error has occurred in channel acquisition, the print operation in the image forming device 103 can be appropriately executed.

In step S1915, the control unit 201 informs the image forming device 103 of the number or numbers that identifies or identify one or a plurality of acquired channels via the high-speed serial communication unit 308, high-speed serial communication connector 310, and high-speed serial communication I/F 105 using one-to-one asynchronous transfer such as asynchronous transfer mode. Subsequently, in step S1916, the control unit 201 sets the operation mode in the print operation on the basis of the acquired channel or channels. In step S1917, the control unit 201 transfers image data to the image forming device 10 using the channel or channels of which the image forming device 103 has been informed. After a print process for printing image data is done by the image forming device 103, the flow returns to step S1910. Note that the print process in step S1917 is the same as that in FIG. 9 of the first embodiment, and a detailed description thereof will be omitted.

(Device Search Process)

Figure 20:
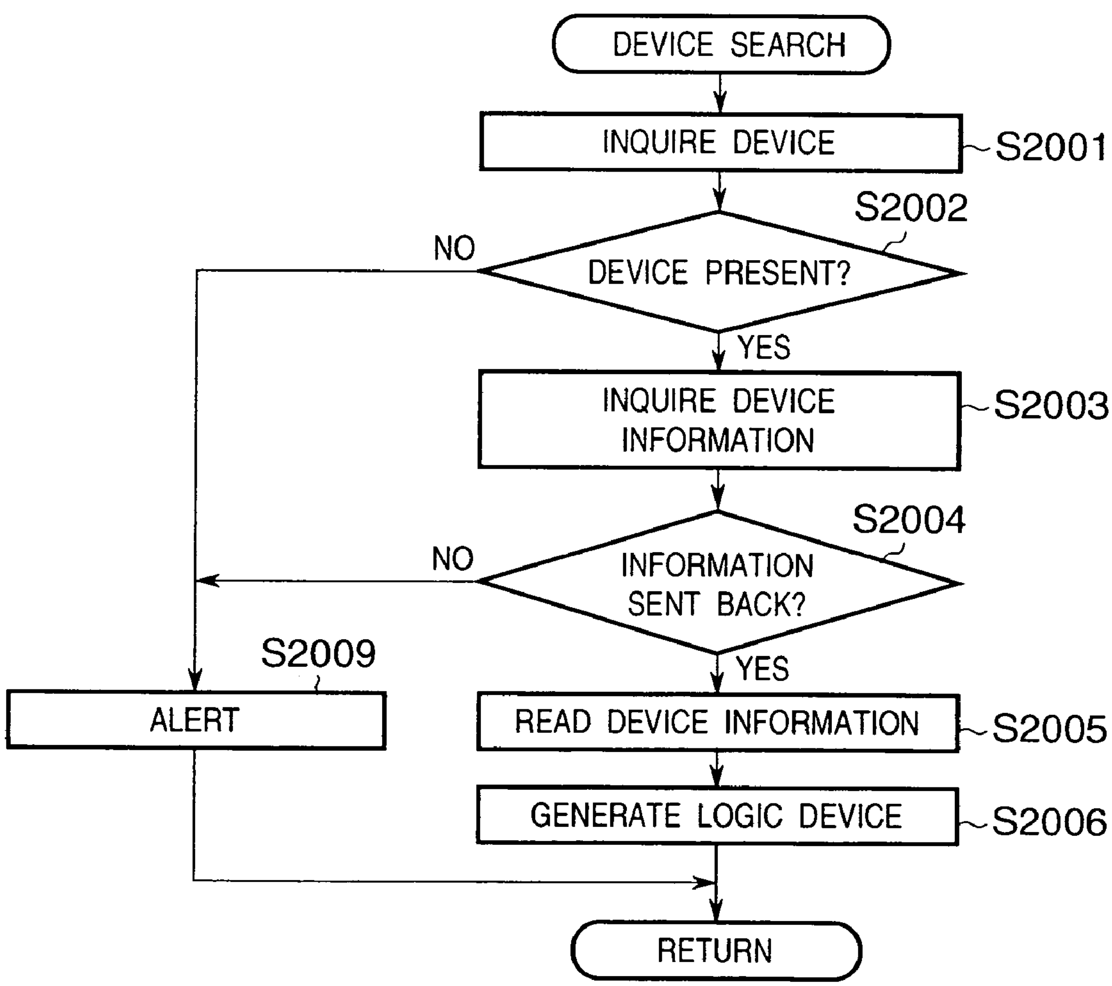
FIG. 20 is a flow chart showing the device search routine of the computer in the second embodiment.

FIG. 20 is a flow chart showing the details of the device search process in step S1903 in FIG. 19A. Referring to FIG. 20, the control unit 201 inquires of the high-speed serial communication unit 208 in step S2001 as to whether a new device connected to one of the high-speed serial communication I/Fs 104, 105, 106, and 107 is an image scanning device such as a scanner or the like which can scan and transmit image data, or an image forming device such as a printer or the like which can receive and print image data. If it is determined in step S2002 that a scanner or printer in question, e.g., the image scanning device 102 or image forming device 103 is present on one of the high-speed serial communication I/Fs 104, 105, 106, and 107, the control unit 201 inquires device information in step S2003.

It is checked in step S2004 if device information is sent back from the image scanning device 102 or image forming device 103. If YES in step S2004, the control unit 201 saves the received device information on a given area of the second storage unit 205 in step S2005. In case of a scanner such as the image scanning device 102 or the like, the device information includes the resolution and number of lines of scanning elements, the types of color filters, the distance between neighboring scanning elements, a scanning speed, grant/denial for a change in scanning speed, an offset correction amount between neighboring scanning elements, a white balance correction value, a shading correction value, operation mode information, and the like. On the other hand, in case of a printer such as the image forming device 103 or the like, the device information includes the number of photosensitive drums, the colors used in image formation, the distance between neighboring photosensitive drums, an image forming speed, grant/denial for a change in image forming speed, a misregistration correction amount between neighboring photosensitive drums, operation mode information, and the like.

In step S2006, the control unit 201 generates a logic device corresponding to the image scanning device 102 or image forming device 103, which is used in the OS to scan and receive image data or to transfer and print image data, thus ending the device search process.

If it is determined in step S2002 that the device in question such as an image forming device or the like is not present on one of the high-speed serial communication I/Fs 104, 105, 106, and 107, or if it is determined in step S2004 that no device information is sent back, the flow advances to step S2009, and the control unit 201 generates a predetermined alert using an image, voice, or text on the display 211, thus ending the device search process.

(Scan Data Reception Process)

Figure 21:
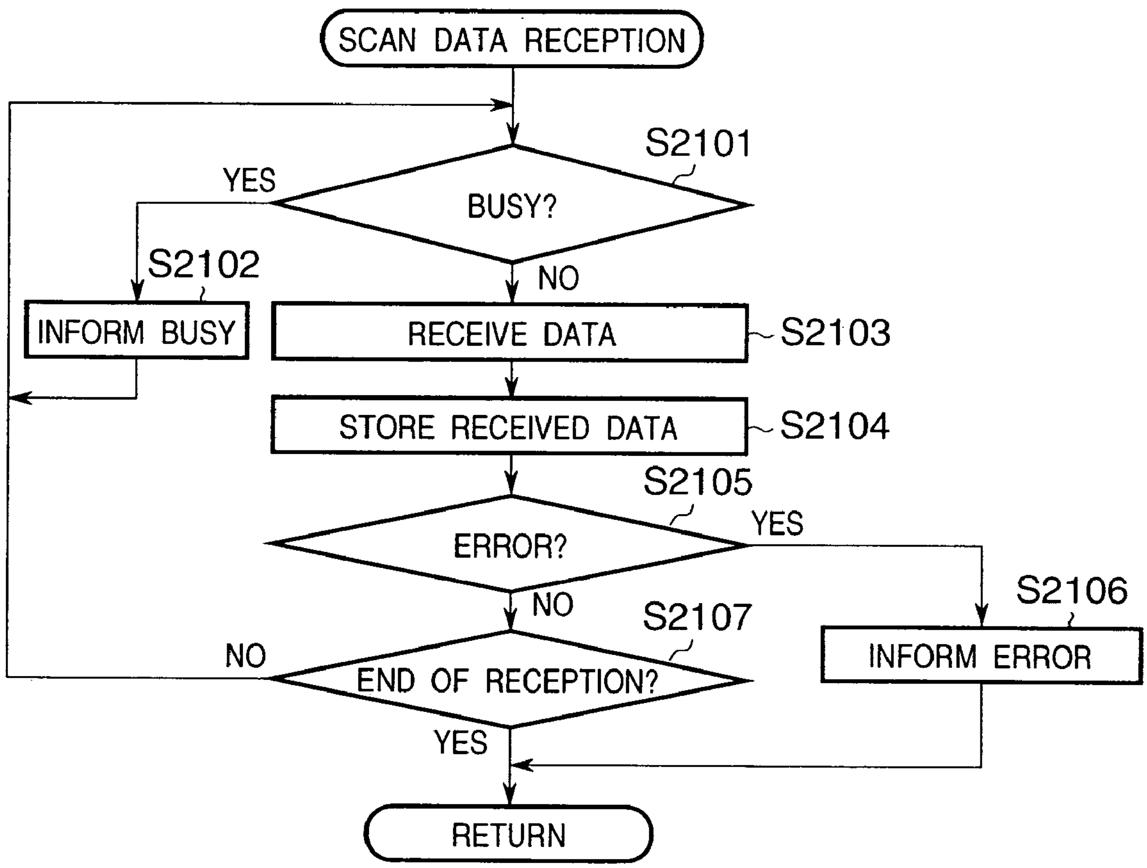
FIG. 21 is a flow chart showing the scan data reception routine of the computer in the second embodiment.

FIG. 21 is a flow chart showing the details of the scan data reception process in step S1906 in FIG. 19A. Referring to FIG. 21, if the control unit 201 determines in step S2101 that the computer is busy, i.e., it cannot receive any data from the image scanning device 102, the control unit 201 sends busy status to the image scanning device 102 using asynchronous transfer mode in step S2102, and the flow returns to step S2101. If it is determined in step S2101 that it is ready to receive data, the control unit 201 cancels busy status in step S2103. As a consequence, the image scanning device 102 begins to transmit image data in isochronous transfer mode, and the high-speed serial communication unit 208 begins to receive the image data. In step S2104, the control unit 201 sequentially stores the data received in isochronous transfer mode in a given area of the second storage unit 205.

If it is determined in step S2105 that no error is detected in image data reception from the image scanning device 102, the flow returns to step S2101 to repeat a series of processes until the control unit 201 receives the end of scan from the image scanning device 102 using asynchronous transfer mode in step S2107. If it is determined in step S2105 that an error has occurred in image data reception from the image scanning device 102, the control unit 201 sends error status to the image scanning device 102 using asynchronous transfer mode in step S2106, thus ending the scan data reception process routine.

<Scan Operation in Image Scanning Device 102>

Figure 22A:
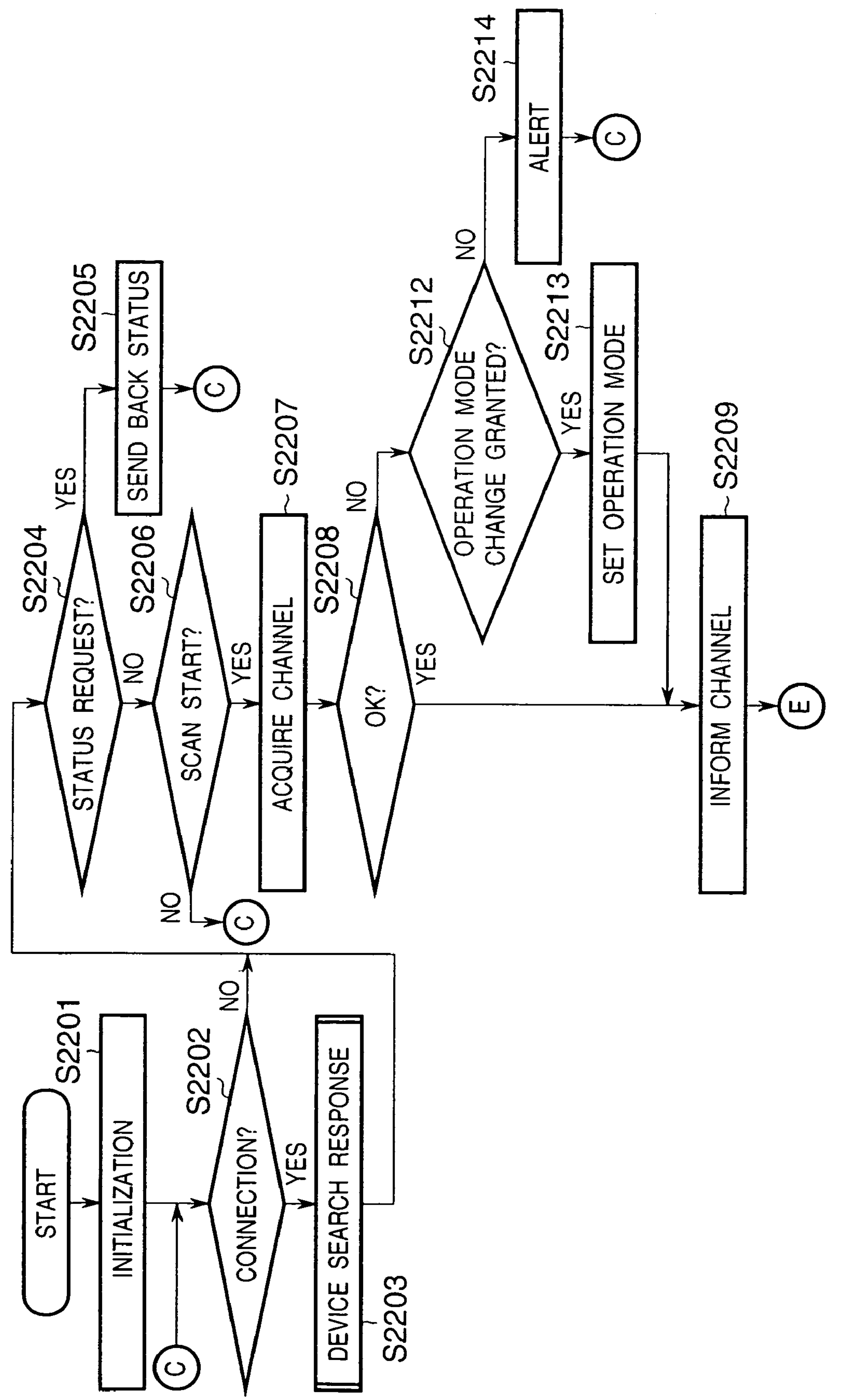
FIGS. 22A–22B are flow charts showing the main routine of the image scanning device in the second embodiment.
Figure 22B:
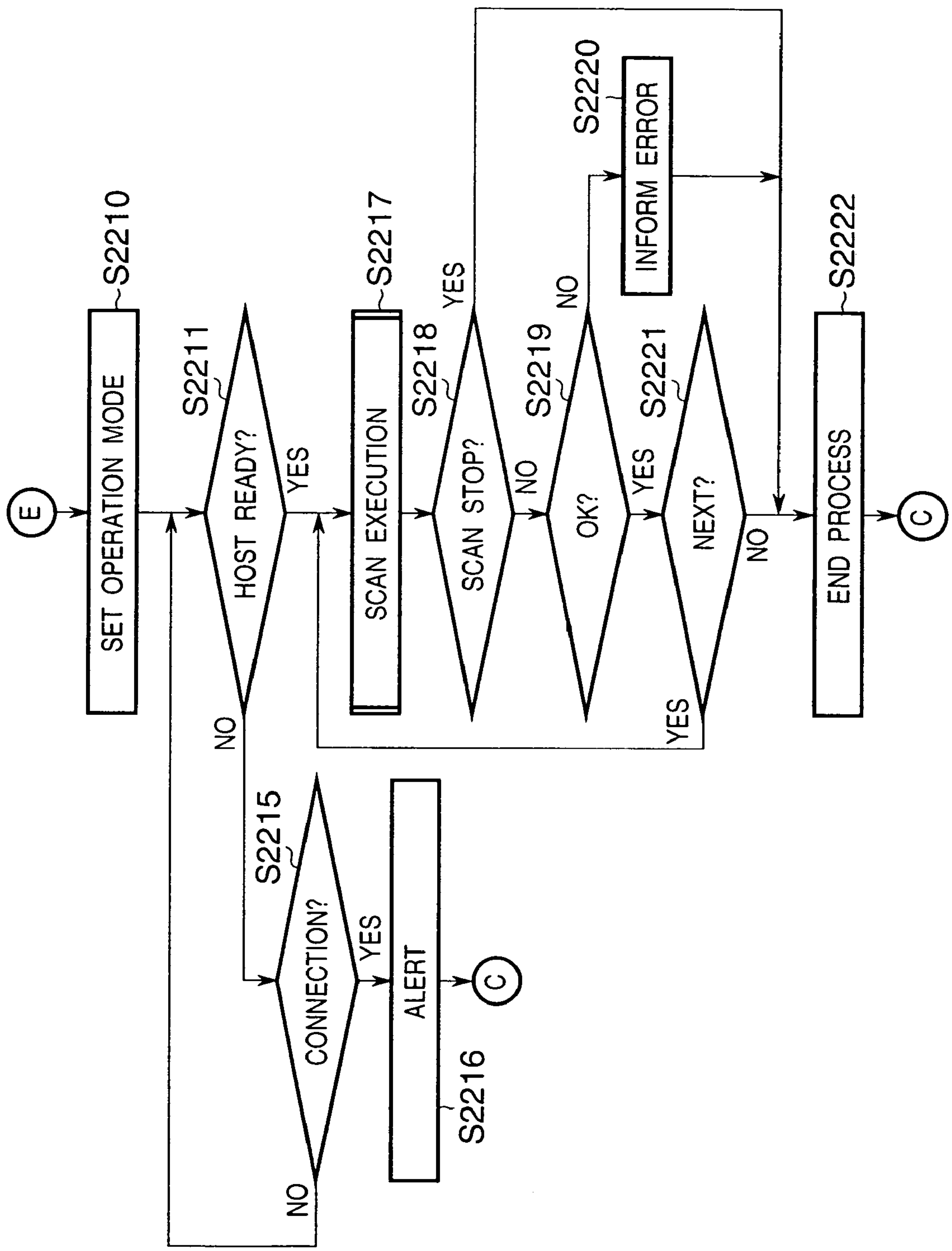

FIGS. 22A–22B are flow charts showing the main routine upon executing the scan operation in the image scanning device 102 in this embodiment.

Upon power ON of the image scanning device 102, the control unit 301 initializes flags, registers, control variables, and the like, executes a control program such as an operating system stored in a given area of the first storage unit 302, and initializes the respective units of the image scanning device 102 in step S2201. The control unit 301 checks in step S2202 if a new device including the image scanning device 102 is connected to one of the high-speed serial communication I/Fs 104, 105, 106, and 107. If YES in step S2202, the flow advances to step S2203 to execute a device search response process. The sequence of the device search response process in step S2203 is the same as that shown in FIG. 11 in the first embodiment.

On the other hand, if it is determined in step S2202 that no new device is connected, the flow advances to step S2204. If a command that requests printer status is received from the computer 101 via the high-speed serial communication I/Fs 105 and 106 in step S2204, the control unit 301 sends status information to the computer 101 using the one-to-one asynchronous transfer mode in step S2205, and the flow returns to step S2202. If no status request is detected, the flow advances to step S2206. If it is determined in step S2206 that scan start is not directed by input operation at the console 305 or a command from the computer 101, the flow returns to step S2202.

On the other hand, if it is determined in step S2206 that scan start is directed, the control unit 301 executes a channel acquisition process, for acquiring a required number of channels whose data transfer cycles are guaranteed like isochronous transfer mode, on the high-speed serial communication I/Fs 105 and 106 in step S2207. The start of scan is directed by the operation input at the console 305 or a command from the computer 101. If no error is found in channel acquisition in step S2208, the flow advances to step S2209; if any error has occurred, e.g., if the required number of channels cannot be assured, the flow advances to step S2212.

The control unit 301 checks in step S2212 if the operation mode of the image scanning device 102 can be changed. If the operation mode cannot be changed, the control unit 301 generates a predetermined alert using an image, voice, or text on the display 304 in step S2214, and the flow returns to step S2202. On the other hand, if the operation mode can be changed, the control unit 301 changes the operation mode in step S2213, and the flow advances to step S2209.

The operation mode that can be changed includes the image scanning speed corresponding to the number of acquired channels, the number of image scans per page of original image data, image quality upon scan, and the like. Such change in operation mode of the image scanning device can change the size (transfer rate) of image data to be transferred per unit time from the image scanning device 102 to the computer 101. Hence, if the number of acquired channels is insufficient for the current operation mode, the operation mode of the image scanning device 102 is changed to reduce the image data transfer rate, thus decreasing the number of required channels. In this way, even when channel acquisition fails, the scan operation in the image scanning device 102 can be appropriately executed. In this embodiment, a case will be exemplified below wherein the image scanning speed is changed as the operation mode of the image scanning device 102.

In step S2209, the control unit 301 informs the computer 101 of a number or numbers that identifies or identify one or a plurality of acquired channels via the high-speed serial communication unit 308, high-speed serial communication connector 310, and high-speed serial communication I/F 105 in asynchronous transfer mode. In step S2210, the control unit 301 sets the operation mode in the scan operation on the basis of the acquired channel or channels or the redistributed channel or channels if channel redistribution has been done.

If it is determined in step S2211 that the computer 101 is ready to receive scan data, the flow advances to step S2217. However, if the computer 101 is not ready to receive data even after an elapse of predetermined period of time in step S2215, the control unit 301 generates a predetermined alert using an image, voice, or text on the display 304 in step S2216. The flow then returns to step S2202.

In step S2217, the control unit 301 executes a scan execution process. That is, the control unit 301 transfers image data scanned in the set operation mode to the computer 101 using the channel or channels of which the computer 101 has been informed. The details of the scan execution process in step S2217 is the same as that in FIG. 13 in the first embodiment.

If it is determined in step S2218 that the scan operation is to be sopped on the basis of the operation input at the console 305 or a command coming from the computer 101, the control unit 301 executes a predetermined end process required in the image scanning device 102 in step S2222, and the flow then returns to step S2202.

If an error is found in the scan execution process in step S2219, the control unit 301 sends error status to the computer 101 using asynchronous transfer mode in step S2220, and the flow advances to step S2222 to end the scan process.

If no error is found in the scan execution process in step S2219, and the next scan is to be executed subsequently in step S2221, the flow returns to step S2217 to repeat a series of operations. If the next scan need not be executed, the flow advances to step S2222 to end the scan process.

<Print Operation in Image Forming Device 103>

Figure 23A:
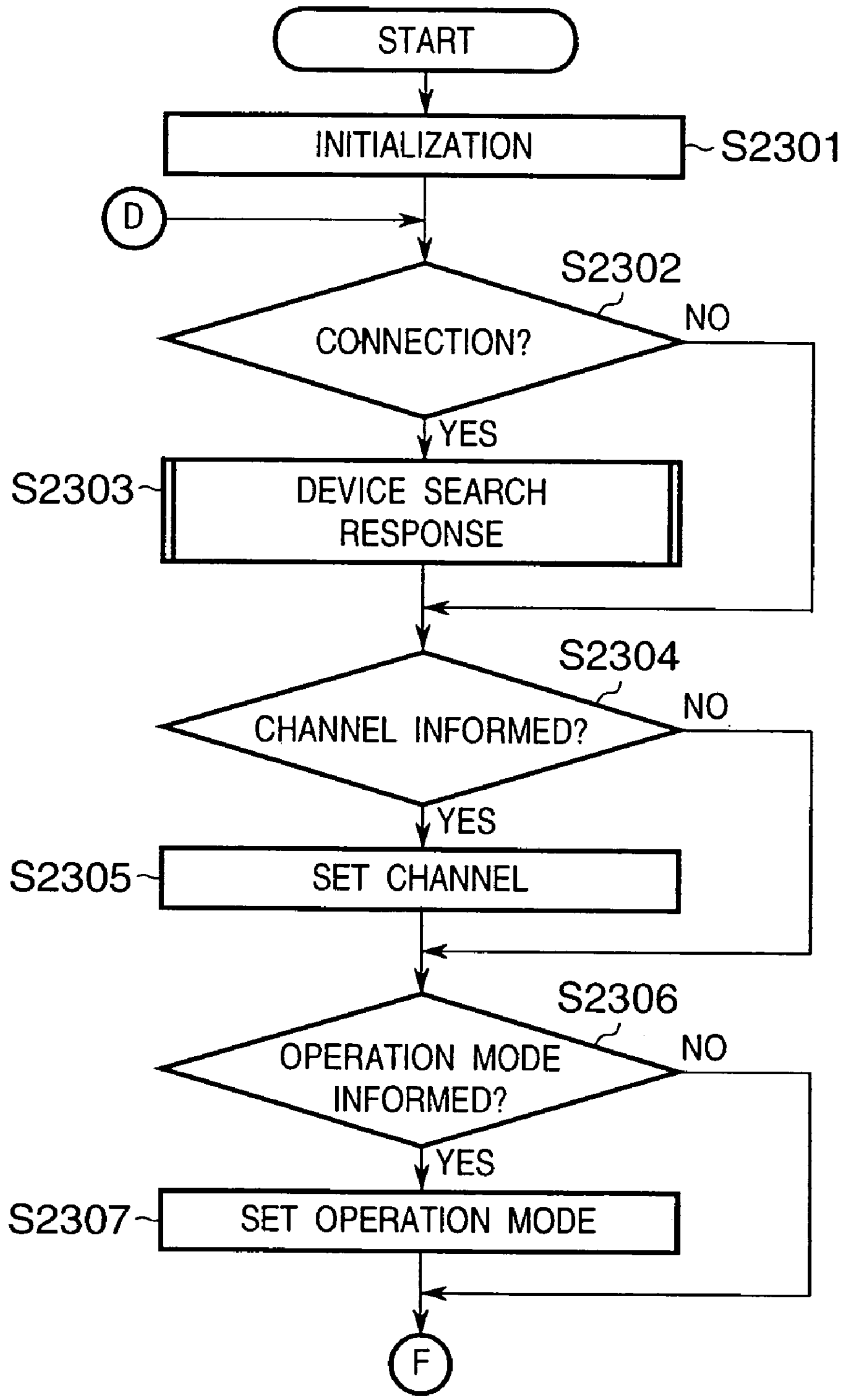
FIGS. 23A–23B are flow charts showing the main routine of the image forming device in the second embodiment.
Figure 23B:
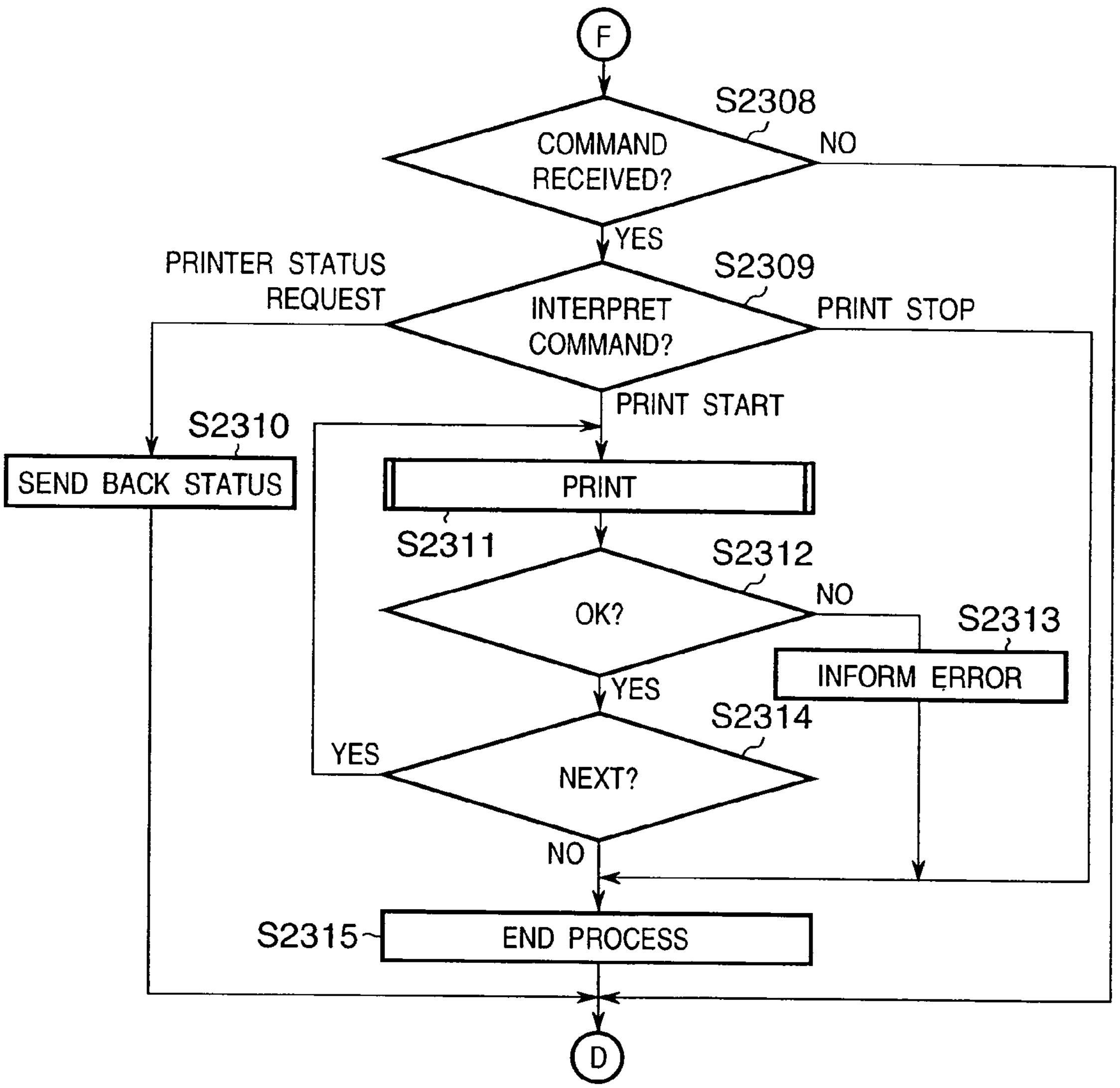

FIGS. 23A–23B are flow charts showing the main routine of the image forming device 103 of this embodiment. The print operation in the image forming device 103 will be explained below with reference to FIGS. 23A–23B.

Upon power ON of the image forming device 103, the control unit 401 initializes flags, registers, control variables, and the like, executes a control program such as an OS stored in a given area of the first storage unit 402, and initializes the respective units of the image forming device 103 in step S2301. The control unit 401 checks in step S2302 if a new device including the image forming device 103 is connected to one of the high-speed serial communication I/Fs 104, 105, 106, and 107. If YES in step S2302, the control unit 401 executes a device search response process in step S2303. The details of the device search response process in step S2303 are as has already been described above with reference to the flow chart in FIG. 11 in the first embodiment.

If no new device is connected in step S2302, the flow advances to step S2304. If the control unit 401 receives a number or numbers that identifies or identify one or a plurality of channels, that have been acquired by the computer 101 and are used in isochronous transfer mode, from the computer 101 via the high-speed serial communication I/Fs 105 and 106 using asynchronous transfer mode in step S2304, it saves the received channel identification number or numbers in a given area of the first storage unit 402, and makes predetermined setups required for receiving image data using isochronous transfer mode in step S2305. On the other hand, if no channel identification number is received in step S2304, the flow advances to step S2306.

It is checked in step S2306 if the operation mode of the image forming device 103 suitable for the number of isochronous transfer channels acquired by the computer 101 is notified from the computer 101 via the high-speed serial communication I/F's 105 and 106 using asynchronous transfer mode. If YES in step S2306, the control unit 401 saves the notified operation mode in a given area of the first storage unit 402, and makes predetermined setups required for printing image data received using isochronous transfer mode in the operation mode notified from the computer 101, in step S2307. Note that the operation mode to be notified includes the print speed of the image forming device 103, the quality of an image to be printed, and the like. Upon setting the operation mode, if the number of channels acquired by the computer 101 is insufficient for the current operation mode, the operation mode such as the print speed, image quality, or the like of the image forming device 103 is changed and set to reduce the size of image data to be transferred per unit time. In this fashion, the data transfer rate can be changed in correspondence with the number of acquired channels. For this reason, even when the number of channels that can be acquired is insufficient, the print operation can be appropriately executed.

On the other hand, if it is determined in step S2306 that no operation mode is notified, the flow advances to step S2308. It is checked in step S2308 if a command is received from the computer 101 using asynchronous transfer mode via the high-speed serial communication I/Fs 105 and 106. If YES in step S2308, the control unit 401 interprets the received command in step S2309. If the received command is the one that requests printer status, the control unit 401 sends that status to the computer 101 using asynchronous transfer mode in step S2310, and the flow returns to step S2302. On the other hand, if it is determined in step S2309 that the received command is the one indicating print start, the control unit 401 executes a print process in step S2311. The print process has already been described earlier in the first embodiment with the aid of FIG. 15.

If it is determined in step S2312 that an error has occurred in the print process in step S2311, the control unit 401 sends error status to the computer 101 using asynchronous transfer mode in step S2313, and executes a predetermined end process required in the image forming device 103 in step S2315. After that, the flow returns to step S2302. On the other hand, if no error is found in the print process in step S2311, and the next print is to be executed subsequently in step S2314, the flow returns to step S2311 to repeat a series of operations. If the next print need not be executed in step S2314, the control unit 401 executes a predetermined end process required in the image forming device 103 in step S2315, and the flow then returns to step S2302.

Since the computer 101, image scanning device 102 (scanner), and image forming device 103 (printer) of this embodiment communicate with each other in this way, a color image can be scanned and printed.

To restate, according to this embodiment, in an image processing system that connects a computer to image processing devices such as an image scanning device, image forming device, and the like via high-speed serial buses, since the operation mode of each image processing device is changed in correspondence with the number of channels acquired for image data transfer from the computer, the image processing device in question can always execute an appropriate image process on the basis of the transferred image data.

[Third Embodiment]

The third embodiment of the present invention will be described below.

In the second embodiment mentioned above, when the number of channels acquired by the image scanning device 102 is insufficient, the operation mode is set to reduce the image scanning speed, thus allowing image scanning while the size of image data to be transferred per unit time is reduced (steps S2212, S2213 in FIG. 22A and S2210 in FIG. 22B). In the third embodiment, when the number of channels acquired by the image scanning device 102 is small, the operation mode is changed and set to obtain single original image data by executing a plurality of scans, e.g., double scans and the like, thereby reducing the size of image data to be transferred per unit time.

An image processing system in this embodiment is comprised of the computer 101, image scanning device 102, and image forming device 103 shown in FIG. 1 as in the first embodiment described above. Since the detailed arrangement of the computer 101 in this embodiment is the same as that shown in FIG. 2 in the first embodiment, a detailed description thereof will be omitted.

The operations in the image processing system of this embodiment are substantially the same as those shown in the flow charts of FIGS. 19A to 23 in the second embodiment, described above, except for the scan execution process shown in FIG. 13. For this reason, the scan execution process in this embodiment is shown in detail in the flow charts in FIGS. 23A–23B, and will be explained below.

Figure 24:
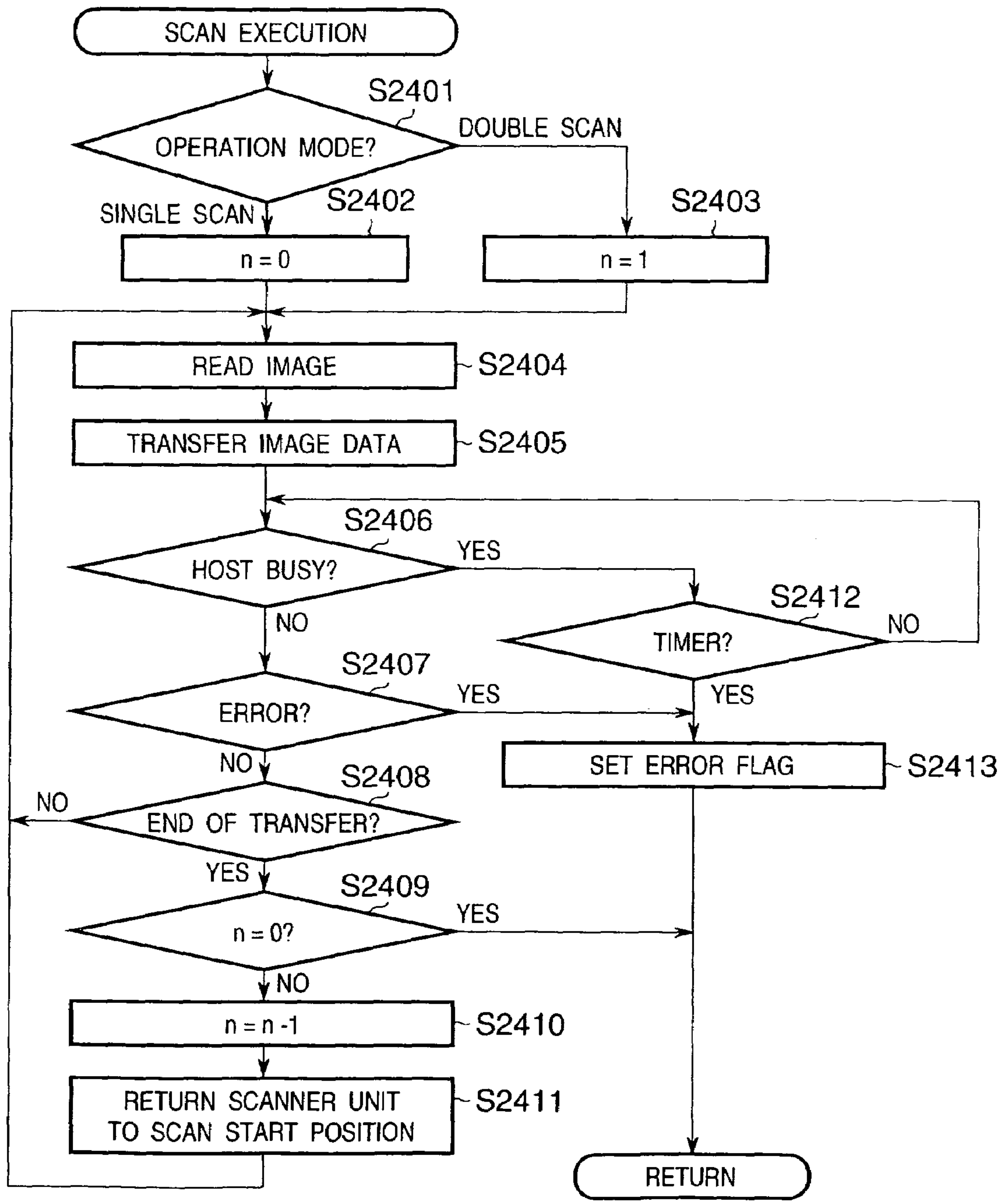
FIG. 24 is a flow chart showing the scan execution routine of the image scanning device in the third embodiment according to the present invention.

FIG. 24 is a flow chart showing the details of the scan execution process in the image scanning device 102 in step S2217 in FIG. 22B.

In steps S2401 to S2403, the control unit 301 sets an initial value in variable n in correspondence with the set operation mode. More specifically, if the operation mode is a "single scan (normal) mode", "0" is set in variable n; if the operation mode is a "double scan mode", "1" is set in variable n.

In step S2404, the control unit 301 scans an original image in accordance with the operation mode using the image scanning units 341, 342, and 343. More specifically, if the "single scan mode" is set, the control unit 301 executes normal original scan; if the "double scan mode" is set, the control unit 301 scans, e.g., the upper half of an original image as ½ the entire image data of the original image. The control unit 301 sends the respective scanned color image data to the image processing units 331, 332, and 333, which execute predetermined image processes such as shading correction, white balance correction, masking correction, and the like. In step S2405, the control unit 301 transfers the image data to the computer 101 in isochronous transfer mode via the high-speed serial communication unit 308, high-speed serial communication connector 309, and high-speed serial communication I/F 105. If the "double scan mode" is selected, since the image data size to be transferred is halved, the transfer rate can be reduced.

If it is determined in step S2406 that the control unit 301 has not received any host busy cancel command from the computer 101 using asynchronous transfer mode within a predetermined period of time measured in step S2412, the flow advances to step S2413, and the control unit 301 sets an error flag, thus ending the scan execution process.

On the other hand, if it is determined in step S2406 that the control unit 301 receives a host busy cancel command from the computer 101 using asynchronous transfer mode, it checks in step S2407 if image data transfer is being normally executed. If YES in step S2407, the flow returns to step S2404 to repeat a series of operations until the image data transfer is finished. On the other hand, if it is determined in step S2407 that an error has occurred during image data transfer to the computer 101, the control unit 301 sets an error flag in step S2413, thus ending the scan execution process.

If it is determined in step S2408 that the image data transfer has been finished, the control unit 301 checks in step S2409 if variable n=0. If NO in step S2409, the control unit 301 sets n=n−1 in step S2410, and returns the scan unit 13 of the image scanning device 102 to the scan start position in step S2411. After that, the flow returns to step S2404 to repeat a series of scan process operations. As described above, since scan is done in correspondence with the set operation mode in step S2404, if the second scan is to be done in the "double scan mode", the remaining ½ image data on the original, i.e., the lower half of the original is scanned.

On the other hand, if it is determined in step S2409 that n=0, the scan execution process ends.

As described above, when the set operation mode is the "single scan mode", the scan execution process ends after the image scan operation in step S2404 is executed once. However, when the "double scan mode" is set, the image scan operation repeats itself twice, and the scan execution process then ends.

To recapitulate, according to this embodiment, the number of scans in the image scanning device is changed in correspondence with the number of channels acquired for image data transfer. More specifically, if the number of acquired channels is insufficient for the current operation mode, the operation mode of the image scanning device is changed to increase the number of scans. In this way, the data transfer volume per unit time upon transferring scanned image data to the computer can be reduced. Hence, even when the number of acquired channels is small, the image scanning device can appropriately scan an image.

In this embodiment, when the number of channels acquired by the image scanning device 102 is small, the operation mode is changed to set the double scan mode. However, a multiple scan mode including an arbitrary number of scans may be set in consideration of the image data transfer rate corresponding to the number of acquired channels. The multiple scan mode of the image scanning device 102 may be set to execute a plurality of scans in units of colors such as R scan, G scan, and B scan, or a plurality of scans may be alternately done in units of lines or pixels in correspondence with the number of scans.

In the second and third embodiments mentioned above, one each of the computer 101, image scanning device 102, and image forming device 103 are connected to the high-speed serial communication I/Fs 104, 105, 106, and 107 to build the system. Also, the present invention can be applied to a system in which one or a plurality of computers, image scanning devices, and image forming devices are connected.

Furthermore, one or a plurality of devices other than the computer 101, image scanning device 102, and image forming device 103 may be connected to the high-speed serial communication I/Fs 104, 105, 106, and 107. In such case, channels can be dynamically redistributed between the connected devices on high-speed serial communication I/Fs as in the above embodiments.

In the above embodiments, image data is transferred from the image scanning device 102 to the computer 101. Alternatively, image data may be temporarily transferred from the image scanning device to a server, and then transferred from the server to the computer. On the other hand, after the computer transfers an image scanning command to the server, image data may be transferred from the image scanning device to the server. In such cases, a series of processes described as those to be done between the image scanning device and computer in the embodiment of the present invention may be implemented between the image scanning device and server.

In the above embodiments, image data is transferred from the computer 101 to the image forming device 103. Alternatively, after image data is temporarily transferred from the computer to the server, that image data may be transferred from the server to the image forming device. Also, after the computer transfers an image forming command to the server, the server may transfer image data to the image forming device. In such cases, a series of processes described as those to be done between the computer 101 and image forming device 103 in each embodiment described above may be implemented between the server and image forming device.

Moreover, an arrangement for directly transferring image data from the image scanning device to the image forming device may be used. That is, the present invention is applicable to such arrangement as long as the operation mode in an image processing device can be changed in correspondence with the number of channels for image data transfer.

To summarize the first to third embodiments, in an image processing system according to the present invention, when the total of the number of channels that have already been assigned to a given device and the number of newly requested channels has exceeded the number of channels the system has upon generation of a new channel acquisition request from another device in the system, the total number of channels required in the system including the device to which channels have already been assigned is adjusted to be equal to or smaller than the number of channels the system has.

To attain the adjustment, in the first embodiment, the device to which channels have already been assigned is made to release releasable channels, and those released channels are assigned to the device that issued the new channel request.

To attain the adjustment, in the second and third embodiments, the number of channels required for the device that issued the new channel request is decreased, and those channels are assigned to that device.

Or when the number of channels is still insufficient even by the method described in the first or second embodiment, the first and second embodiments may be combined.

More specifically, to adjust the number of channels, when the number of assigned channels cannot reach the number of requested channels even after the device to which channels have already been assigned is made to release releasable channels, and those released channels are assigned to the device that issued the new channel request, the number of channels required for the device that issued the new channel request is decreased.

Conversely, when the number of assigned channels cannot reach the number of requested channels even after the device that issued the new channel request decreases the number of requested channels, the device to which channels have already been assigned is made to release releasable channels, and those released channels are assigned to the device that issued the new channel request.

For this purpose, if the required number of channels cannot be assured in step S113 in FIG. 5, an alert indicating this is immediately generated in step S114. Instead, the flow may advance to step S1918 in FIG. 19B. More specifically, it is checked if the operation mode can be changed. If the operation mode can be changed, the required number of channels is decreased. In this case, upon completion of step S1917, the flow does not return to step S1910, but returns to step S107 in FIG. 5.

On the other hand, if it is determined in step S1918 in FIG. 19B that the operation mode cannot be changed, the flow branches to step S1920. Instead, the flow branches to step S112 in FIG. 5. In this case, upon completion of step S117, the flow returns to step S1910 in FIG. 19B.

In this manner, when redistribution of already assigned channels and a change in operation mode that can decrease the number of required channels are combined, the total number of required channels can be further decreased, and many devices can transfer data using channels.

The user may designate the priority levels of channel reassignment and a change in operation mode. For this purpose, one of the aforementioned two-way processes may be selected in accordance with the user's instruction.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

To restate, in a system that connects a plurality of devices using a communication scheme that can change the bandwidth depending on the number of channels used, a device, the required bandwidth of which changes depending on the operation mode lends a channel to another device as needed, thus preventing data transfer from being disabled due to an insufficient number of channels.

On the other hand, in an image processing system that connects a plurality of image processing devices via serial buses, even when channels required for isochronous transfer of image data in a given operation mode cannot be assured, an appropriate image process can be done by changing the operation mode.

As many apparently widely different embodiments of the present invention can be made without departing from the spirit and scope thereof, it is to be understood that the invention is not limited to the specific embodiments thereof except as defined in the appended claims.

What is claimed is:

1. A method for controlling an image processing system having a plurality of devices connected with each other via a communication path including a plurality of channels, said method comprising:

a reserving step, of reserving a plurality of channels;

a first communicating step, of storing read image data to a hard disk storage and communicating the image data stored in the hard disk storage using a part of the plurality of channels;

a second communicating step, of, without storing the read image data to the hard disk storage, communicating the read image data using a part of the plurality of channels, wherein the number of channels used in the second communicating step exceeds the number of channels used in said first communicating step;

a receiving step, of receiving a channel request; and a step of, when the channel request is received in said receiving step upon communicating in said second communicating step, re-assigning a part of unused channels in the plurality of channels if a number of requested channels does not exceed the number of unused channels, and communicating in said first communication step so as to increase a number of channels to be used for re-assigning of channels if a number of the requested channels exceeds the number of unused channels, wherein the image data is communicated in either said first communicating step or said second communicating step.

2. A method for controlling an image processing system having a plurality of devices connected with each other via a communication path including a plurality of channels, said method comprising:

a reserving step, of reserving a plurality of channels;

a first communicating step, of reducing read image data and communicating the reduced image data using a part of the plurality of channels;

a second communicating step, of, without reducing the read image data, communicating the read image data using a part of the plurality of channels, wherein the number of channels used in the second communicating step exceeds the number of channels used in said first communicating step;

a receiving step, of receiving a channel request; and a step of, when the channel request is received in said receiving step upon communicating in said second communicating step, re-assigning a part of unused channels in the plurality of channels if a number of requested channels does not exceed the number of unused channels, and communicating in said first communication step so as to increase a number of channels to be used for re-assigning of channels if a number of the requested channels exceeds the number of unused channels, wherein the image data is communicated in either said first communicating step or said second communicating step.

3. A method for controlling an image processing system having a plurality of devices connected with each other via a communication path including a plurality of channels, said method comprising:

a reserving step, of reserving a plurality of channels;

a first communicating step, of compressing read image data and communicating the compressed image data using a part of the plurality of channels;

a second communicating step, of, without compressing the read image data, communicating the read image data using a part of the plurality of channels, wherein the number of channels used in the second communicating step exceeds the number of channels used in said first communicating step;

a receiving step, of receiving a channel request; and a step of, when the channel request is received in said receiving step upon communicating in said second communicating step, re-assigning a part of unused channels in the plurality of channels if a number of requested channels does not exceed the number of unused channels, and communicating in said first communication step so as to increase a number of channels to be used for re-assigning of channels if a number of the requested channels exceeds the number of unused channels, wherein the image data is communicated in either said first communicating step or said second communicating step.

* * * * *

UNITED STATES PATENT AND TRADEMARK OFFICE

CERTIFICATE OF CORRECTION

PATENT NO. : 6,967,973 B2
DATED : November 22, 2005
INVENTOR(S) : Yoichi Yamagishi It is certified that error appears in the above-identified patent and that said Letters Patent is hereby corrected as shown below:

Column 12,
Line 12, “step Sill” should read -- step S111 --.

Column 20,
Line 61, “step S1107” should read -- step S1907 --.

Signed and Sealed this

Eleventh Day of April, 2006

JON W. DUDAS

*Director of the United States Patent and Trademark Office*